(12) United States Patent  (10) Patent No.: US 9,454,773 B2
Leung et al.  (45) Date of Patent: Sep. 27, 2016

(54) AGGREGATOR SYSTEM HAVING A PLATFORM FOR ENGAGING MOBILE DEVICE USERS

(71) Applicant: Danal Inc., San Jose, CA (US)

(72) Inventors: Paris Leung, San Jose, CA (US); Ritesh Jain, San Jose, CA (US); Vijaya Reddy Jallu, San Jose, CA (US)

(73) Assignee: Danal Inc., San Jose, CA (US)

( * ) Notice: Subject to any disclaimer, the term of this patent is extended or adjusted under 35 U.S.C. 154(b) by 0 days.

(21) Appl. No.: 14/458,071

(22) Filed: Aug. 12, 2014

(65) Prior Publication Data

US 2016/0048877 A1 Feb. 18, 2016

(51) Int. Cl.
*G06K 5/00* (2006.01)
*G06Q 30/02* (2012.01)

(52) U.S. Cl.
CPC ...... *G06Q 30/0267* (2013.01); *G06Q 30/0201* (2013.01); *G06Q 30/0253* (2013.01); *G06Q 30/0257* (2013.01)

(58) Field of Classification Search
USPC ............................ 235/380, 375, 487; 705/27
See application file for complete search history.

(56) References Cited

U.S. PATENT DOCUMENTS

| | | | |
|---|---|---|---|
| 5,586,260 A | 12/1996 | Hu | |
| 5,684,950 A | 11/1997 | Dare et al. | |
| 5,875,296 A | 2/1999 | Shi et al. | |
| 5,918,232 A | 6/1999 | Pouschine et al. | |
| 6,606,663 B1 | 8/2003 | Liao et al. | |
| 6,678,731 B1 | 1/2004 | Howard et al. | |
| 6,934,706 B1 | 8/2005 | Mancuso et al. | |
| 7,039,714 B1 | 5/2006 | Blakley, III et al. | |
| 7,356,559 B1* | 4/2008 | Jacobs et al. | 709/203 |
| 7,373,659 B1 | 5/2008 | Vignoles et al. | |
| 7,735,122 B1 | 6/2010 | Johnson et al. | |
| 7,970,743 B1 | 6/2011 | Kilday et al. | |
| 8,407,465 B2 | 3/2013 | Naaman et al. | |
| 8,645,282 B2 | 2/2014 | Vakil et al. | |

(Continued)

FOREIGN PATENT DOCUMENTS

| | | |
|---|---|---|
| CA | 2723173 C | 10/2013 |
| CN | 102184204 B | 3/2013 |

(Continued)

OTHER PUBLICATIONS

International Search Report and Written Opinion of the International Searching Authority for application No. PCT/US2015/043494, mailed on Oct. 29, 2015.

(Continued)

*Primary Examiner* — Edwyn Labaze
(74) *Attorney, Agent, or Firm* — Shvarts & Leiz LLP

(57) ABSTRACT

Methods and systems are presented for attracting and engaging a user for a merchant system. A selectable option associated with the merchant system is displayed on a client device associated with a user. An indication of a user selection of the selectable option is received, and a content page is provided to the client device in response to the indication. Customer relationship management (CRM) information associated with the user of the client device is received from a carrier system associated with the client device. A transaction is processed for the user on behalf of the merchant system, based on the CRM information, and data associated with the user and the transaction are output to the merchant system.

27 Claims, 10 Drawing Sheets

(56) References Cited

U.S. PATENT DOCUMENTS

| | | |
|---|---|---|
| 8,655,782 B2 | 2/2014 | Poon et al. |
| 2001/0037469 A1 | 11/2001 | Gupta et al. |
| 2001/0045451 A1 | 11/2001 | Tan et al. |
| 2002/0156905 A1 | 10/2002 | Weissman |
| 2002/0184217 A1 | 12/2002 | Bisbee |
| 2003/0028451 A1* | 2/2003 | Ananian ............... 705/27 |
| 2003/0074580 A1 | 4/2003 | Knouse et al. |
| 2003/0115142 A1 | 6/2003 | Brickell |
| 2004/0128542 A1 | 7/2004 | Blakley, III et al. |
| 2004/0148410 A1 | 7/2004 | Howard et al. |
| 2005/0005094 A1 | 1/2005 | Jamieson et al. |
| 2005/0015490 A1 | 1/2005 | Saare et al. |
| 2005/0055578 A1 | 3/2005 | Wright et al. |
| 2005/0257072 A1 | 11/2005 | Cross et al. |
| 2006/0156391 A1 | 7/2006 | Salowey |
| 2007/0094503 A1 | 4/2007 | Ramakrishna |
| 2007/0143829 A1 | 6/2007 | Hinton et al. |
| 2008/0184351 A1 | 7/2008 | Gephart |
| 2008/0256593 A1 | 10/2008 | Vinberg et al. |
| 2009/0006646 A1 | 1/2009 | Duarte |
| 2009/0132405 A1 | 5/2009 | Scipioni et al. |
| 2009/0132813 A1 | 5/2009 | Schibuk |
| 2009/0144540 A1 | 6/2009 | Davis et al. |
| 2009/0210293 A1 | 8/2009 | Steele et al. |
| 2010/0010932 A1 | 1/2010 | Law et al. |
| 2010/0017596 A1 | 1/2010 | Schertzinger |
| 2010/0077208 A1 | 3/2010 | Appiah |
| 2010/0199334 A1 | 8/2010 | Ehrensvard et al. |
| 2011/0047132 A1 | 2/2011 | Kilday et al. |
| 2011/0065418 A1 | 3/2011 | Ryu et al. |
| 2011/0082767 A1 | 4/2011 | Ryu et al. |
| 2011/0087880 A1 | 4/2011 | Sorniotti et al. |
| 2011/0125565 A1 | 5/2011 | MacIlwaine et al. |
| 2011/0167470 A1 | 7/2011 | Walker |
| 2011/0231919 A1 | 9/2011 | Vangpat et al. |
| 2012/0084199 A1 | 4/2012 | Stone |
| 2012/0124676 A1 | 5/2012 | Griffin et al. |
| 2012/0150748 A1 | 6/2012 | Law et al. |
| 2012/0150750 A1 | 6/2012 | Law et al. |
| 2012/0167162 A1 | 6/2012 | Raleigh |
| 2012/0227094 A1 | 9/2012 | Begen et al. |
| 2012/0245985 A1 | 9/2012 | Cho et al. |
| 2012/0246004 A1* | 9/2012 | Book et al. ............. 705/14.58 |
| 2012/0275377 A1 | 11/2012 | Lehane et al. |
| 2012/0289188 A1 | 11/2012 | Marcus et al. |
| 2013/0030934 A1 | 1/2013 | Bakshi et al. |
| 2013/0061333 A1 | 3/2013 | Davis et al. |
| 2013/0086656 A1 | 4/2013 | Paddon et al. |
| 2013/0198598 A1 | 8/2013 | Kirsch |
| 2013/0325611 A1 | 12/2013 | Delug |
| 2013/0346329 A1* | 12/2013 | Alib-Bulatao et al. ....... 705/319 |
| 2014/0047238 A1 | 2/2014 | Harty et al. |
| 2014/0156531 A1 | 6/2014 | Poon et al. |
| 2014/0244348 A1* | 8/2014 | Zamani et al. ............. 705/7.29 |
| 2014/0249921 A1* | 9/2014 | Nicklin et al. ............. 705/14.53 |
| 2014/0278978 A1* | 9/2014 | O'Connor et al. ........ 705/14.53 |
| 2014/0282836 A1 | 9/2014 | Cai et al. |
| 2014/0344718 A1* | 11/2014 | Rapaport et al. ............. 715/753 |
| 2014/0373117 A1 | 12/2014 | Le Saint |
| 2015/0019402 A1* | 1/2015 | Berlin et al. .................... 705/38 |
| 2015/0188777 A1 | 7/2015 | Frost |

FOREIGN PATENT DOCUMENTS

| | | |
|---|---|---|
| EP | 1560394 A1 | 8/2005 |
| GB | 2507725 A | 5/2004 |
| KR | 10-2003-0024127 | 3/2003 |
| KR | 101107191 B1 | 1/2012 |
| WO | 2006016375 A1 | 2/2006 |
| WO | 2010008397 A1 | 1/2010 |
| WO | WO 2013/008056 A1 | 1/2013 |

OTHER PUBLICATIONS

U.S. Appl. No. 14/458,025, filed Aug. 12, 2014, Banerjee et al.

U.S. Appl. No. 14/458,058, filed Aug. 12, 2014, Banerjee et al.

Stubblebine, S.G. "Recent-secure authentication: enforcing revocation in distributed systems." Security and Privacy, 1995. Proceedings. 1995 IEEE Symposium on. IEEE, 1995.

Novotny, J. et al. "An Online Credential Repository for the Grid: MyProxy." High Performance Distributed Computing, 2001. Proceedings. 10th IEEE International Symposium on. IEEE, 2001.

Aubry, P. et al. "ESUP-Portail: open source Single Sign-On with CAS (Central Authentication Service)." Proc. of EUNIS04-IT Innovation in a Changing World (2004).

Nobayashi, D. et al. "Development of Single Sign-On System with Hardware Token and Key Management Server." IEICE Transactions on Information and Systems 92.5 (2009).

International Search Report and Written Opinion of the International Searching Authority for application No. PCT/US2015/043492, mailed on Oct. 30, 2015.

International Search Report and Written Opinion of the International Searching Authority for application No. PCT/US2015/043493, mailed on Nov. 30, 2015.

EPO Form 1507N, Extended European Search Report and Search Opinion, from the European Patent Office in European Patent Application No. 15158564.3 dated Dec. 2, 2015.

EPO Form 1507N, Extended European Search Report and Search Opinion, from the European Patent Office in European Patent Application No. 15158567.6 dated Jan. 8, 2016.

EPO Form 1507N, Extended European Search Report and Search Opinion, from the European Patent Office in European Patent Application No. 15158569.2 dated Mar. 10, 2016.

* cited by examiner

AGGREGATOR SYSTEM HAVING A PLATFORM FOR ENGAGING MOBILE DEVICE USERS

The present disclosure relates to an aggregator system that implements a platform for attracting and engaging users of mobile devices on behalf of merchant systems, and more particularly relates to an aggregator system that communicates with a carrier system in order to more effectively engage users of mobile devices.

SUMMARY

Methods and systems are provided for attracting and engaging new users for a merchant system. Typically, advertising is performed to attract new users to a merchant system, where the advertising is usually controlled by the merchant system. A merchant system may be web server that publishes an online ecommerce website, or any other entity that provides products, services, or both. Processing a transaction, such as a new user registration, to engage attracted new users has proven to be a cumbersome process. The new users must complete transaction related information, including payment information, which may be tedious and difficult to enter on a client device, such as a mobile phone. Accordingly, the present disclosure provides an aggregator system capable of attracting and engaging users for a merchant system in a more streamlined and less cumbersome manner by advertising products or services provided by a merchant to attract users associated with client devices, engaging the users by processing one or more transactions for the users based on respective user information, and providing data associated with engaged users and data associated with the processed transactions to the merchant system.

In some embodiments, an aggregator system causes a selectable option associated with a merchant system to be displayed on a client device. The aggregator system further receives an indication of a user selection of the selectable option, and provides a content page to the client device in response to the user selection of the selectable option. The aggregator system further receives CRM information from a carrier system in response to the user selection of the selectable option, where the CRM information is associated with the user. The aggregator system further processes a transaction for the user on behalf of a merchant system based at least in part on the CRM information. The aggregator system further communicates data associated with the user and data associated with the transaction to the merchant system.

In some embodiments, an aggregator method includes displaying a selectable option associated with a merchant system on a client device associated with a user. The aggregator method further includes receiving an indication of a user selection of the selectable option, and providing a content page to the client device based on the user selection of the selectable option. The aggregator method further includes receiving CRM information from the carrier system in response to the user selection of the selectable option, where the CRM information is associated with the user. The aggregator method further includes processing a transaction for the user on behalf of the merchant system based at least in part on the CRM information. The aggregator method further includes communicating data associated with the user and data associated with the transaction to the merchant system.

In some embodiments, a non-transitory computer readable medium has stored instructions that, when executed, direct a mobile customer acquisition platform (MCAP) to display a selectable option associated with a merchant system on a client device associated with a user. The instructions, when executed, further direct a client device input to receive an indication of a user selection of the selectable option. The instructions, when executed, further direct the MCAP to provide a content page to the client device based on the user selection of the selectable option. The instructions, when executed, further direct a carrier input to receive CRM information associated with the user in response to the user selection of the selectable option. The instructions, when executed, further direct the MCAP to process a transaction on behalf of the merchant system based at least in part on the CRM information. The instructions, when executed, further direct a merchant output to output data associated with the user and data associated with the transaction to the merchant system.

BRIEF DESCRIPTION OF THE FIGURES

The above and other features of the present disclosure, its nature and various advantages will be more apparent upon consideration of the following detailed description, taken in conjunction with the accompanying drawings in which.

DETAILED DESCRIPTION OF THE FIGURES

Figure 1:
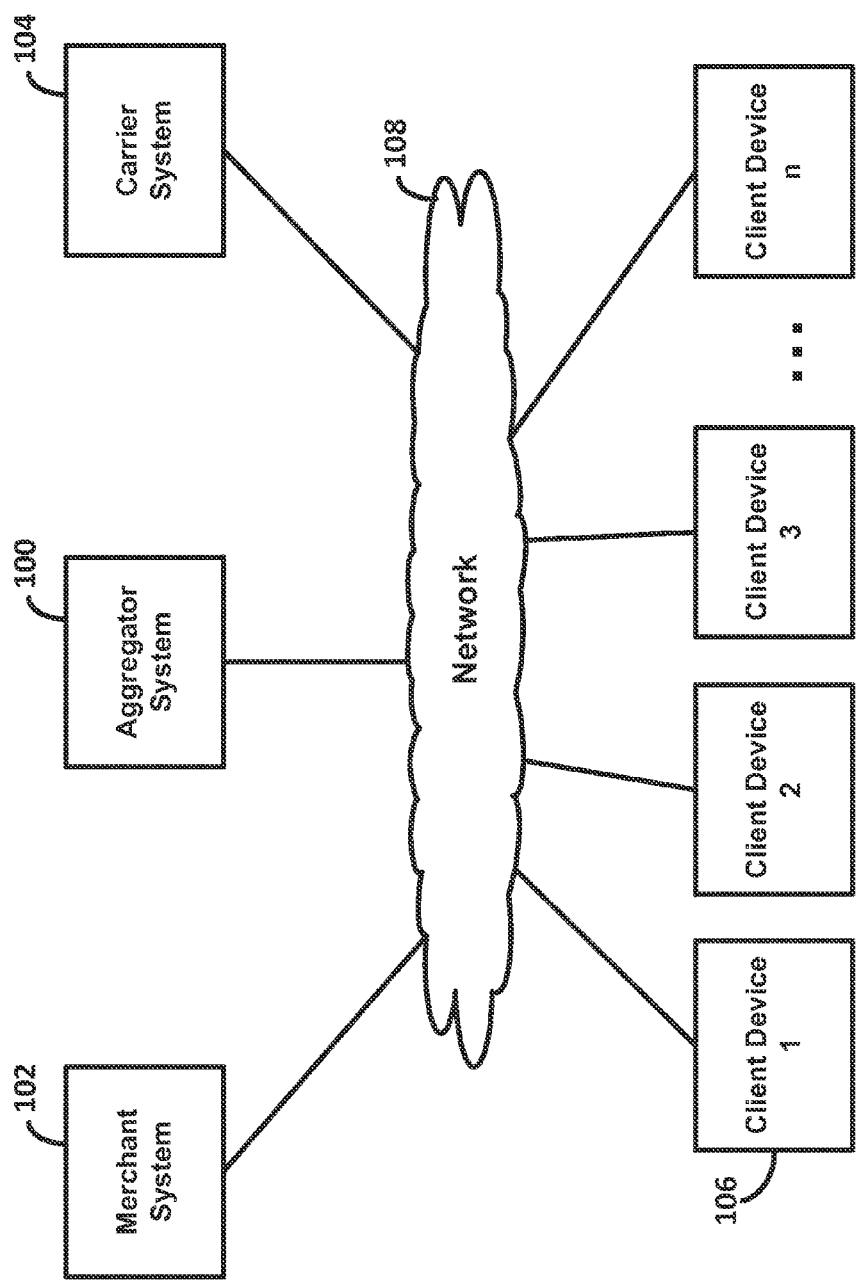
FIG. 1 is a block diagram of illustrative systems and devices implemented in a network environment in accordance with some embodiments of the present disclosure.

The present disclosure is directed towards attracting new users for a merchant system and using user related information to engage the new users for the merchant system. Techniques for attracting users to a product or service offered by a merchant in the mobile device context, for example, can rely on delivering digital advertisements to users' mobile devices from a server controlled by a third party entity or controlled by the merchant whose products or services are being promoted by the delivered advertisements. These digital advertisements, which are displayed on the recipient mobile device's display screen can by selected by the user (e.g., by touching the displayed advertisement on a touch sensitive display). The selection of the advertisement can result in content being delivered (e.g., in the form of a web page), from a server controlled by, for example, the merchant. In some cases, the merchant may desire to have new users register an account, which may include a payment transaction in response to a user selecting a delivered advertisement. For example, an online dating service may be promoted by a delivered digital advertisement, the selection of which will present the user with a form to fill out to process a payment in order to register the user with the online dating service. Often times, these types of forms are tedious to fill out and provide for a less than ideal experience for the user. In addition, sophisticated merchant systems are often required to implement the ability to deliver digital advertisements and to process responses thereto.

In order to provide a more efficient and pleasant experience and in order to avoid requiring sophisticated merchant system infrastructures, an aggregator system, distinct from the merchant system, may be used to implement a platform that delivers digital advertisements to mobile devices, including targeted advertisements, and also processes the selection of the advertisements by users, including payment and registration transactions. In order to streamline the process of entering into a transaction and to create a more pleasant experience for the user, the aggregator system may be a trusted system that is able to communicate with carrier systems, such as AT&T, associated with mobile devices. The aggregator system can retrieve personal information from the carrier system associated with an account of a user of a mobile device who desires to enter into a transaction with a merchant by virtue of selecting a delivered digital advertisement, where the aggregator system first receives consent from the user to retrieve the personal information. This information can be used in processing the transaction by the aggregator system and will avoid the need to have the user enter that information manually. When the aggregator system processes a new user transaction, information may then be communicated to the merchant system regarding the processed transaction.

For example, an aggregator system of the present invention may advertise a product or service provided by a merchant system to attract a new user, and may receive and use information related to the new user to pre-populate data fields related to a transaction necessary to engage the new user, such as a payment transaction or a registration. The user related information may be, for example, customer relationship management (CRM) information stored at a carrier system. The user may be associated with a client device, for example, a mobile phone, and may have an account with the carrier system. The carrier system provides mobile network services to the client device. In the United States, examples of carrier systems include systems operated by Verizon, AT&T, and Sprint, among others. CRM information, as referred to herein, is understood to refer to any suitable user-specific data, including personal information such as, for example, name, address, telephone number, email, client device location, payment information, any other suitable information, or any combination thereof. A carrier system typically stores CRM information associated with its users. Attempts are made by the carrier system to keep its stored CRM information secure because of the sensitive nature of the personal information contained therein.

In accordance with the present disclosure, a system is provided that is configured to access CRM information stored at the carrier system and to use the CRM information to attract and engage new users for a merchant system. In some embodiments, this is accomplished by advertising a product or service provided by a merchant, using CRM information associated with users who select the advertisement to process transactions for these users, and communicating user information and transaction information to the merchant system. This provides a merchant system with new users without requiring the merchant system to directly attract and engage the new users.

FIG. 1 is a block diagram of illustrative systems and devices implemented in a network environment in accordance with some embodiments of the present disclosure. Aggregator system 100, merchant system 102, carrier system 104, and client device 106 may be coupled via network 108. Network 108 may include or communicate with any suitable one or more network structure or structures, such any suitable local area network (LAN), wide area network (WAN) (e.g., the internet), wireless local area network (WLAN), a mobile communications network, any other suitable network, or any combination thereof. In some embodiments, network 108 may be a carrier network provided and operated by carrier system 104. The lines coupling network 108 to the various systems and devices may represent a wireless coupling, a wired coupling, any other suitable coupling, or any combination thereof. For example, devices and systems may be connected to network 108 through a WiFi or Ethernet connection, with access to the internet. In another example, client device 106 may be coupled to network 108 using one or more mobile communications networks, such as a 3G, 4G, LTE, cellular network, any other suitable mobile communications network, or any combination thereof.

Aggregator system 100 may be any suitable system which acts as an intermediary between two or more systems, such as between client device 106 and carrier system 104, merchant system 102 and carrier system 104, client device 106 and merchant system 102, between any other systems and devices, or any combination thereof. Aggregator system 100 may act as an intermediary by facilitating the communication of information, such as payment information (e.g. credit card information, PayPal information, routing number data, bank account information, billing address, legal name, social security number, any other suitable information related to making a payment, or any combination thereof) and/or registration information (e.g., name, address, email, phone number, social security number, payment information, any other suitable information, or any combination thereof), between two systems. It should be understood that protected information associated with a user, such as a social security number, may only be accessed by trusted systems and devices to which permission has been granted by the user. In some embodiments, certain personal information, such as social security number information need not be accessed, stored, and/or used by aggregator system 100. Aggregator system 100 may be trusted by carrier system 104, and may access CRM information stored in carrier system 104 for secure communication to merchant system 102 or client device 106. An example of aggregator system 100 is the system developed and operated by Danal Inc. (doing business as BilltoMobile) located in San Jose, Calif., which provides mobile payment services to merchants using data provided by United States carrier systems. In some embodiments of the present disclosure, aggregator system 100 may be configured to provide CRM information to client device 106 or merchant system 102 for use in a transaction via network 108.

Merchant system 102 may be any suitable one or more entities capable of entering into a transaction with a client device. Examples of a transaction include a purchase transaction for goods, services, or both provided by merchant system 102, a money transfer, a bill payment, a transaction that results in access to banking information, banking services, or both, any other suitable transaction, or any combination thereof. Merchant system 102 may include, for example, a web server that publishes a website which requires personal information (e.g., payment information, registration information). Examples of merchant system 102 include systems operated by Amazon.com, Citibank, freecreditscore.com, among others. In some embodiments, merchant system 102 may be configured to communicate with client device 106 (e.g., enable a transaction) using network 108.

Carrier system 104 may be any suitable system which provides mobile network services to client device 106. Providing mobile network services to client device 106 may include providing a carrier network to client device 106. For example, a carrier system may be a system operated by Verizon, Sprint, or AT&T.

Client device 106 is any suitable hardware circuitry, software, or both that can be used to conduct a transaction with merchant system 102 using the carrier network provided by carrier system 104. In some embodiments, a client device of the present disclosure may be a mobile phone. A mobile phone may be associated with a mobile phone number, a carrier system, any other mobile phone identification information, or any combination thereof. A client device may be a tablet device, laptop device, any other suitable client device, mobile or otherwise, or any combination thereof. In some embodiments, carrier system 104 may include or have access to CRM information associated with client device 106, and may be configured to communicate the CRM information to aggregator system 100 via network 108.

Figure 2:
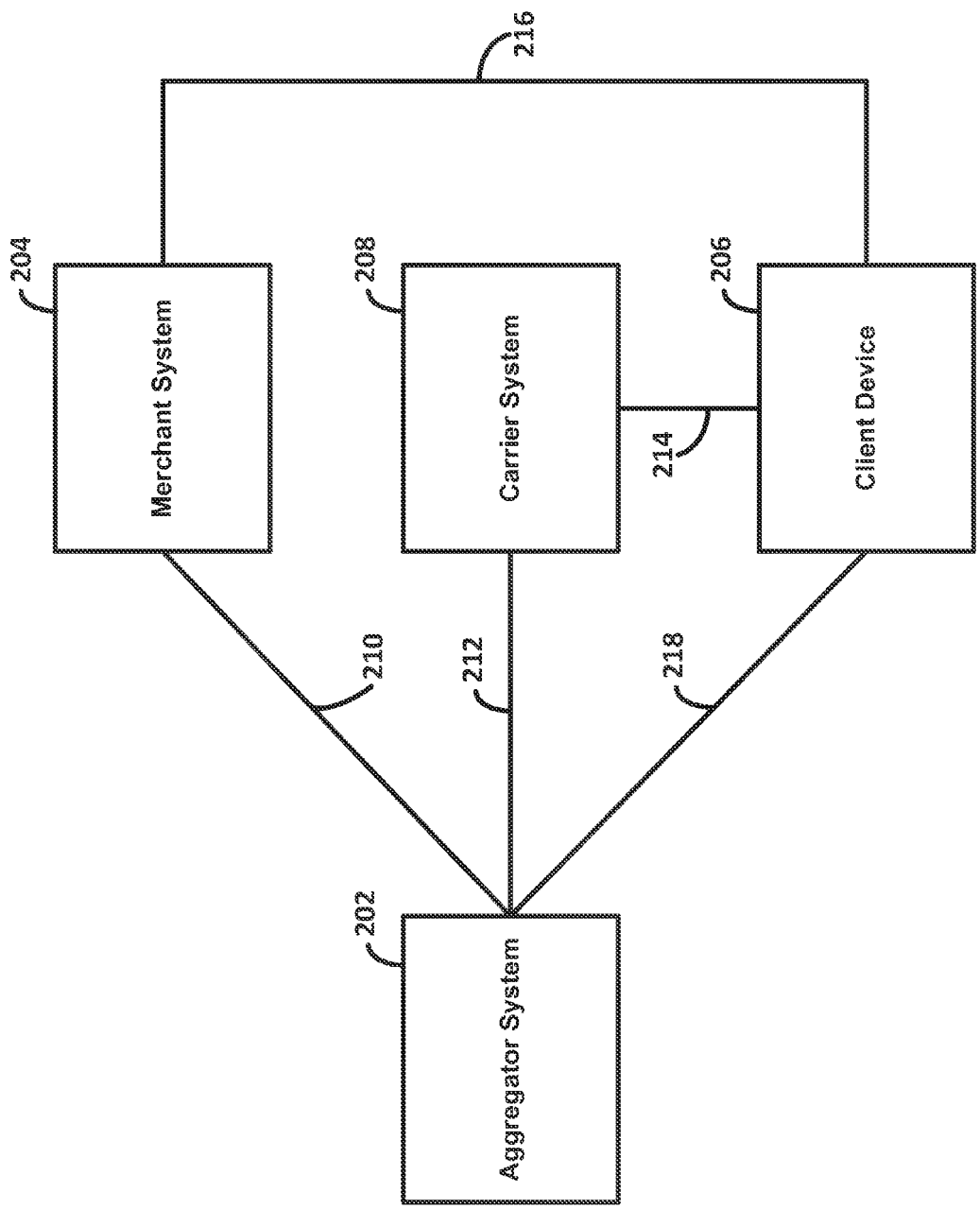
FIG. 2 is a block diagram showing illustrative paths of communication between systems and devices in accordance with some embodiments of the present disclosure.

FIG. 2 is block diagram showing illustrative paths of communication between the systems and devices of FIG. 1 in accordance with some embodiments of the present disclosure. Aggregator system 202 may be configured to communicate with merchant system 204, carrier system 208, and client device 206 via communications channels 210, 212, and 218 respectively. Merchant system 204 may be configured to communicate with aggregator system 202 and client device 206 via communication channels 210 and 218 respectively. Client device 206 may be configured to communicate with merchant system 204, aggregator system 202, and carrier system 208 via communication channels 216, 218, and 214 respectively. Carrier system 208 may be configured to communicate with aggregator system 202 and client device 206 via communication channels 212 and 214 respectively. Communication between systems and devices may include communicating over a network, such as network 108 of FIG. 1, and may include receiving data, sending data, or both.

Figure 3:
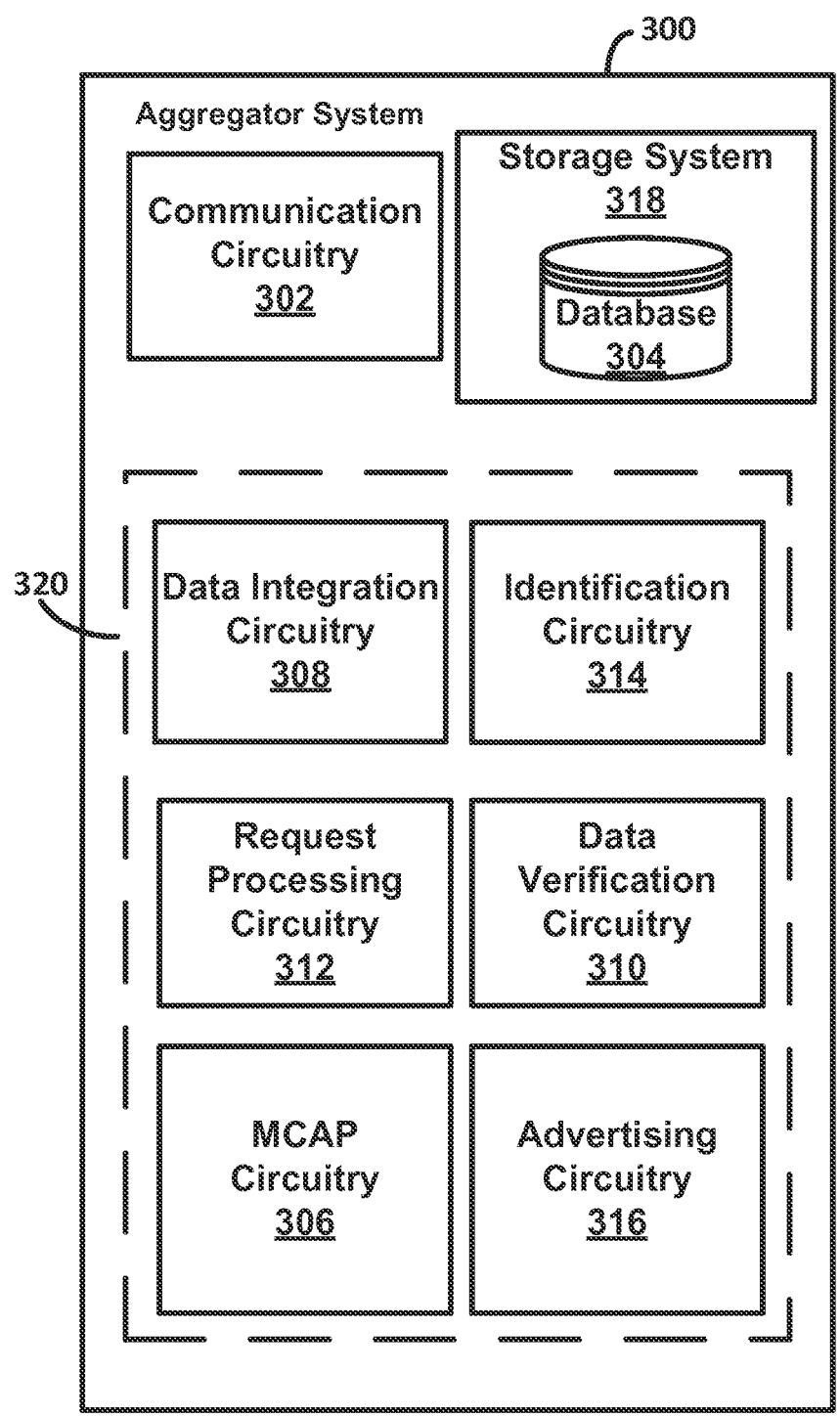
FIG. 3 is a block diagram of an illustrative aggregator system in accordance with some embodiments of the present disclosure.

FIG. 3 is a block diagram of illustrative aggregator system 300 in accordance with some embodiments of the present disclosure. Aggregator system 300 may be any suitable aggregator system, such as aggregator system 100 of FIG. 1 or aggregator system 202 of FIG. 2. In some embodiments, aggregator system 300 may be implemented in a network environment, such as that of FIG. 1. Aggregator system 300 may include any suitable software, hardware circuitry, or both configured to implement the features as described herein. For example, aggregator system 300 may include server hardware circuitry and software. Aggregator system 300 may include communication circuitry 302, storage system 318, and processing equipment 320.

Communication circuitry 302 may be configured with any suitable software, hardwired instructions, or both to communicate with database 304 and processing equipment 320, and may include inputs, outputs, any other mechanisms which facilitate communication with other systems and devices, or any combination thereof. An input or output is a relative communication channel that can be used to receive or send data, respectively. A communication channel may be established as, for example, an IP protocol-based communications session using any suitable network infrastructure, including the Internet, any proprietary LAN, WAN, any other suitable network infrastructure, or any combination thereof. Inputs and outputs may be implemented as one or more physical ports, a data storage device, any other suitable hardware circuitry interface, software interface, or any combination thereof. For example, aggregator system 300 may include a carrier input coupled to a carrier system and configured to receive data from the carrier system, a carrier output coupled to the carrier system and configured to output data to the carrier system, a merchant input coupled to a merchant system and configured to receive data from the merchant system, a merchant output coupled to the merchant system and configured to output data to the merchant system, a client device input coupled to a client device and configured to receive data from the client device, a client device output coupled to the client device and configured to output data to the client device, any other suitable input or output, or any combination thereof. While different inputs and outputs are described, it will be understood that they need not be separate components and two or more of the inputs and/or outputs may be implemented as a single component that can be used to send or receive data relative to more than one destination or source, respectively. For example, communication circuitry 302 may include a transceiver, such as an Ethernet card, or any other suitable device or circuitry which facilitates communication with other systems and devices.

Storage system 318 may include any suitable hardware, software, or both for implementing an organized data storage system capable of storing one or more databases and information related to, for example, merchant data, client device data, user data, authentication, rules, and carrier data. For example, storage system 318 may include database 304. In some embodiments, storage system 318 may store information which is not stored in database 304, such as information related to, for example application programming interfaces (APIs), HTML for content pages, any other suitable information, and any combination thereof.

Database 304 may include any suitable hardware circuitry, software, or both for implementing an organized data storage system capable of storing information related to, for example, merchant data, client device data, user data, and carrier data. Information related to merchant data may include, for example, stock keeping units (SKUs) related to goods for sale, customer service contact information (e.g., a phone number, an email address, a hyperlink for a website), data related to criteria for revoking authentication, any other merchant data, or any combination thereof. Information related to client device data may include, for example, a mobile device number, identification information associated with a client device, any other client device data, or any combination thereof. In some embodiments, database 304 may store encrypted information. For example, hashed information may be generated using a hash operation, and the hashed information may be stored in database 304.

Processing equipment 320 may be configured to process data received from other systems and devices (e.g., a client device, a merchant system, a carrier system, or any other suitable system or device), process data to be output to other systems and devices, generate data (e.g., generate authentication information), analyze data (e.g., identify a client device based on identification information), and perform other tasks. In some embodiments, processing equipment 320 may include one or more circuitries for performing the functionality as described herein, such as mobile customer acquisition platform (MCAP) 306, request processing circuitry 312, data verification circuitry 310, data integration circuitry 308, identification circuitry 314, advertising circuitry 316, any other suitable processing equipment, or any combination thereof. The circuitries within processing equipment 320 may communicate with one another to implement the features as described herein. Additionally, the circuitries within processing equipment 320 may all be implemented together on one or more devices. In some embodiments, processing equipment 320 may communicate with communication circuitry 302 and database 304 to retrieve or transmit information (e.g. identification information, authentication information, any other suitable information, or any combination thereof). For example, processing equipment 320 may send identifying information associated with a client device, such as a mobile phone number, to database 304 to retrieve additional information related to the client device or user in possession of the client device. Processing equipment 320 may be any suitable software, hardware circuitry, or both sufficient to implement the circuitries within. For example, processing equipment 320 may include one or more microprocessors.

Advertising circuitry 316 may be configured with any suitable software, hardwired instructions, or both to provide digital advertisements intended to be displayed on a display screen of a client device. For example, advertising circuitry 316 may be at least a portion or one or more integrated circuit processors. Advertisements may be, for example, advertisements related to the promotion of a product or service provided by a merchant through a system operated by the merchant, referred to herein as a merchant system, which term shall generally refer to the merchant and its associated system. For example, advertising circuitry 316 may be configured to provide advertisements for the promotion of an online dating service provided by a merchant through an associated merchant system. In some embodiments, aggregator system 300 may deliver the advertisements to a client device, such as client device 106 of FIG. 1, using an advertising network or any other suitable entity which enables the delivery of advertisements. An advertising network may be any suitable entity that provides access to one or more websites capable of hosting advertisements. The client device may display advertisements on its display screen using any suitable software, hardware circuitry, or both on the client device.

In some embodiments, advertisements may be targeted advertisements. Targeted advertisements may be, for example, any advertisements targeted to be delivered to a specific subset of users associated with respective client devices based on one or more parameters, such as the carrier system associated with the respective client devices of the users, information related to the age of the users, information related to the gender of the users, information related to the geographic location of the users, any other suitable parameter, or any combination thereof. In some embodiments, aggregator system 300 may determine information, for example age information, about the users of respective client devices and may decide based on this information which advertisements to deliver to which client devices. For example, advertising circuitry 316 may provide an advertisement for the promotion of an online dating service provided by a merchant through an associated merchant system, where the advertisement is targeted to be delivered to client devices belonging to users who are male and have an age between twenty-five and thirty-five. In some embodiments, advertising circuitry 316 may be configured to communicate, for example, using communication circuitry 302, with any suitable entities that have the ability to target the delivery of advertisements to specific users. For example, aggregator system 300 may have a partnership or an agreement with a media-buying company able to target the delivery of advertisements to users between the ages of forty and fifty, and advertising circuitry 316 may deliver advertisements based on information related to users between the ages of forty and fifty that is received from the media-buying company via communication circuitry 302.

An advertisement displayed on a client device may be selectable by a user, for example, as a hyperlink in a web browser. When an advertisement is selected by a user, the user may be provided with additional information about the product or service being promoted by the advertisement. For example, a user may select an advertisement that includes information about a discounted dating membership offered by a merchant system, where the advertisement is displayed on a client device belonging to the user, and in response the client device may display pricing information related to and benefits included in the discounted dating membership being promoted by the advertisement. Advertising circuitry 316 may be at least partially implemented as a part of MCAP 306.

MCAP 306 may be any suitable software, hardware circuitry, or both configured to provide an integrated platform that allows aggregator system 300 to perform functions on behalf of a merchant system and to engage users in connection with a product or service provided by the merchant system. In other words, MCAP 306 may provide a more streamlined process for engaging new users for a merchant system. In some embodiments, features that are used to engage a user associated with a client device may include, for example, providing content pages (e.g., webpages) to client devices related to products or services provided by a merchant system, retrieving information associated with a user of a client device (e.g., CRM information), temporarily storing information associated with a user of a client device, processing a transaction for a user of a client device, any other suitable feature, or any combination thereof. It should be understood that aggregator system 300, or any processing equipment thereof, for example MCAP 306, may temporarily store CRM information associated with a user solely for the purpose of providing information where aggregator system 300 acts as an intermediary between systems and client devices, such that the user's privacy is preserved. For example, aggregator system 300 may temporarily store CRM information associated with a user of a client device until the information is communicated to a merchant system, where aggregator system 300 is configured to act as an intermediary between the merchant system and the client device. If aggregator system 300, or any processing equipment thereof, for example MCAP 306, is deemed to be a trusted system by a carrier system that stores CRM information, and if permission is granted to aggregator system 300 by the carrier system, then aggregator system 300 or any processing equipment or database thereof may be configured to store CRM information.

In some embodiments, MCAP 306 may be configured to provide a content page to a client device to be displayed when a user selects an advertisement. A content page may be, for example, a webpage, or any other suitable document including static or dynamic content. A content page may include, for example, additional information related to the product or service being promoted by the selected advertisement. For example, advertising circuitry 316 may provide an advertisement to a client device that advertises a gym membership offered by a merchant system, and MCAP 306 may be configured to provide a webpage with additional information related to pricing for and benefits included in the gym membership being promoted when a user selects (e.g., clicks on) the advertisement. A content page may include specific information related to a product or service being promoted by a selected advertisement such as, for example, pricing information, a description of products and/or services being promoted by the advertisement, any other suitable information, or any combination thereof. In some embodiments, a content page may also include data fields related to user information and information required for a transaction, where the data fields must be completed for the user to participate in the product or service promoted by the advertisement. For example, a user may select an advertisement related to a promotion for a one-month gym membership, and upon user selection of the advertisement MCAP 306 may display content page on the user's client device which includes information indicating that the gym membership is $24.99/month, benefits information included in the gym membership, data fields related to creating a new user account with the gym, and data fields related to processing a payment of $24.99.

MCAP 306 may determine when to provide a content page to a client device based on a received request to display a content page. For example, when a user selects an advertisement on a client device, advertising circuitry 316 may request MCAP 306 to provide a content page with additional information related to the product or service being promoted by the advertisement. In some embodiments, when advertising circuitry 316 provides targeted advertisements based on information received from third party entity, the third party entity may be configured to request MCAP 306 to provide a content page in response to a user selection of an advertisement. In other embodiments, advertising circuitry 316, or any other suitable entity or processing equipment, may request that MCAP 306 provide a content page in response to a user selection of an advertisement. A request for MCAP 306 to provide a content page to a client device may include calling an MCAP uniform resource locator (URL). In response to a call to the MCAP URL, MCAP 306 may provide a content page (e.g., webpage) to a client device, for example, by redirecting a web browser on the client device to a URL that corresponds to the content page. As used herein, the term "web browser" may include within its scope any suitable software for displaying webpages. For example, when a user selects an advertisement related to a promotion for a product or service provided by a merchant through an associated merchant system, advertising circuitry 316 may call the MCAP URL, and in response the MCAP URL may redirect the user's client device web browser to a URL that corresponds to a content page with additional information regarding the product or service being promoted by the advertisement.

In some embodiments, MCAP 306 may be configured to provide content pages having a layout that is optimized for a client device, established by code written in, for example, HTML 5, Javascript, any other suitable programming language, or any combination thereof. In some embodiments, MCAP 306 may be configured to provide more than one content page, and may be configured to transition from a first content page to a second content page based on user selection of the first content page. For example, MCAP 306 may provide content page A in response to a MCAP URL call, and may be configured to provide content page B in response to a user selection of content included in content page A. Additionally, MCAP 306 may be configured to provide different content pages for different selected advertisements. In some embodiments, parameters identifying the selected advertisement or the product or service being promoted by the selected advertisement may be provided when the MCAP URL is called. For example, MCAP 306 may be configured to provide one content page in response to a MCAP URL call that indicates a user selection of an advertisement A, and may be configured to provide a different content page in response to a MCAP URL call that indicates a user selection of an advertisement B, where advertisement B is different from advertisement A.

In some embodiments, MCAP 306 may be configured to receive CRM information associated with a user of an identified client device. A client device may be identified, for example, using identification circuitry 314 of aggregator system 300. MCAP 306 may receive CRM information from, for example, a carrier system associated with the client device of a user. In some embodiments MCAP 306 may temporarily store CRM information, for example, in a database such as database 304. In some embodiments, MCAP 306 may use the CRM information to process a transaction, such as, for example, a purchase transaction, a user registration, a user account creation, a request for additional information related to a merchant system, any other suitable transaction, or any combination thereof. In some embodiments, MCAP 306 may process a transaction by pre-populating data fields related to the transaction included in a content page. For example, a user may select an advertisement for a dating membership for $30, the user may be identified by aggregator system 300, and MCAP 306 may provide a content page to be displayed on the user's client device that includes data fields related to processing a payment for $30. In this example, MCAP 306 may be configured to access CRM information for the identified user, and to pre-populate the data fields related to processing a payment for $30 based on the CRM information.

In some embodiments, MCAP 306 may be configured to process a transaction using one or more APIs stored in aggregator system 300. The APIs stored in aggregator system 300 may be stored in a database, such as database 304, and may enable MCAP 306 to connect with APIs of a merchant system to perform functions such as processing a transaction on behalf of the merchant system. The APIs stored in aggregator system 300 may be configured to integrate with the APIs of a merchant system, such that the merchant system APIs need not integrate with the APIs stored by aggregator system 300. MCAP 306 may use APIs stored in aggregator system 300 to process a transaction by including one or more APIs in a content page. For example, MCAP 306 may be configured to display a content page that includes data fields required to create a new user account with a merchant system and code that when executed calls an API which enables account creation on behalf of the merchant system, such that a user viewing the content page may create an account with the merchant system.

Identification circuitry 314 may be configured with any suitable software, hardwired circuitry, or both to identify a client device based on client device identification information. For example, identification circuitry 314 may be at least a portion of one or more integrated circuit processors. Identifying a client device may enable aggregator system 300 to access information associated with the client device, to communicate with the client device, to authenticate the client device, to process a transaction on the client device, to perform any other suitable action, or any combination thereof. A client device may be identified, for example, by way of a mobile originated (MO) message identification technique, a mobile terminated (MT) identification technique, a header enrichment identification technique, any other suitable identification technique, or any combination thereof. In some embodiments, client device identification circuitry 314 may be configured to store client device identification information in a database, such as database 304, and may be configured to identify a client device based at least in part on information stored in database 304. Client device identification information may include, for example, information identifying a mobile phone number associated with the client device, information identifying a carrier system associated with the client device, information identifying software or hardware circuitry of the client device, information identifying a user in possession of the client device, any other suitable identification information, or any combination thereof. For example, client device identification circuitry 314 may identify a client device by identifying and storing a mobile phone number associated with a client device based on client device identification information which is received from a carrier system.

Request processing circuitry 312 may be configured with any suitable software, hardwired circuitry, or both to process requests from other systems and devices, such as merchant system 102 of FIG. 1, carrier system 104 of FIG. 1, and client device 106 of FIG. 1. For example, request processing circuitry 312 may be at least a portion of one or more integrated circuit processors. Requests may include a request to output information, a request to accept information, such as a rule, a request to validate information, a request to process a transaction, any other suitable request, or any combination thereof. In some embodiments, one or more requests may be received by communication circuitry 302, and passed from communication circuitry 302 to request processing circuitry 312. Request processing circuitry 312 may determine an appropriate response to each of the one or more requests, such as processing information, retrieving information, transmitting information, any other suitable response, or any combination thereof. In some embodiments, request processing circuitry 312 may be configured to process and/or respond to requests received from other circuitries within processing equipment 320. For example, request processing circuitry 312 may receive a request for information associated with a client device, and may in response retrieve information from database 304 and communicate the information to communication circuitry 302 to be output.

Data verification circuitry 310 may be configured with any suitable software, hardwired circuitry, or both to verify information associated with a client device, such as client device 106 of FIG. 1. For example, data verification circuitry 310 may be at least a portion of one or more integrated circuit processors. In one embodiment, aggregator system 300 may receive information associated with a client device from one or more sources, and data verification circuitry 310 may be configured to verify the information. In another embodiment, request processing circuitry 312 may receive a request from a merchant system to verify information associated with a client device, and data verification circuitry 310 may verify the information. Verification may include comparing received information to information stored in database 304, comparing received information to information received from one or more sources, deterministic matching, probabilistic matching, fuzzy matching, any other suitable verification technique, or any combination thereof. In some embodiments, verifying information associated with a client device may include verifying information associated with a user in possession of the client device.

Data integration circuitry 308 may be configured with any suitable software, hardwired circuitry, or both to integrate information associated with a client device which is received from one or more sources. For example, data integration circuitry 308 may be at least a portion of one or more integrated circuit processors. In one embodiment, aggregator system 300 may receive information associated with a client device from one or more sources, and data integration circuitry 308 may integrate the data received from the one or more sources. Data integration may include, for example, eliminating inconsistencies between information from different sources or between information received from one source and information stored in a database (e.g., database 304), eliminating duplicate information from different sources or between information received from one source and information stored in a database (e.g., database 304), any other suitable integration technique, or any combination thereof. Sources may include interested parties such as, for example, carrier systems, financial institutions, utility companies, government organizations, universities, schools, any other suitable sources, or any combination thereof.

Figure 4:
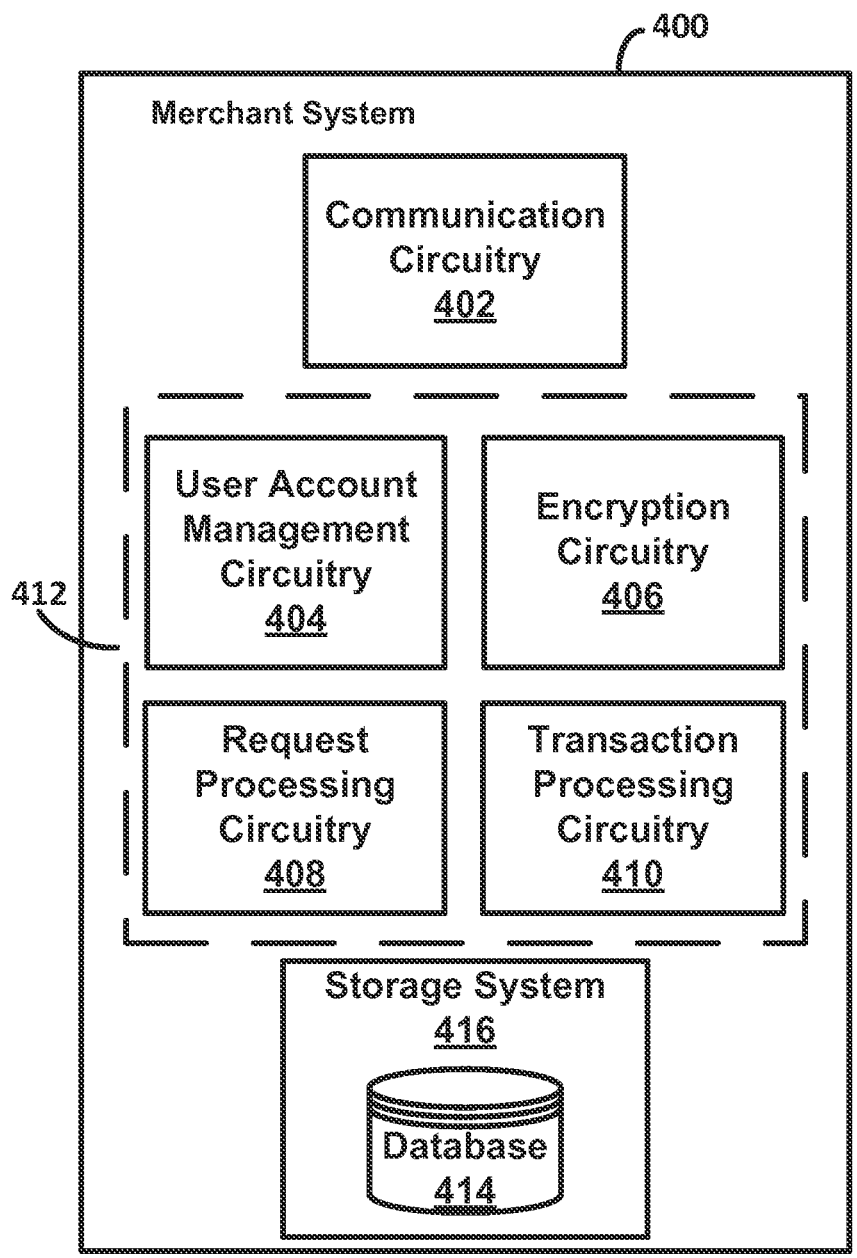
FIG. 4 is a block diagram of an illustrative merchant system in accordance with some embodiments of the present disclosure.

FIG. 4 is a block diagram of illustrative merchant system 400 in accordance with some embodiments of the present disclosure. Merchant system 400 may be any suitable merchant system, for example, merchant system 102 of FIG. 1 or merchant system 204 of FIG. 2. In some embodiments, merchant system 400 may be implemented in a network environment, such as that of FIG. 1. Merchant system 400 may include any suitable software, hardware circuitry, or both configured to implement the features as described herein. For example, merchant system 400 may include server hardware circuitry and software. Merchant system 400 may include communication circuitry 402, storage system 416, and processing equipment 412.

Communication circuitry 402 may be configured with any suitable software, hardwired instructions, or both to communicate with database 414 and processing equipment 412, and may include inputs, outputs, any other mechanisms which facilitate communication with other systems and devices, or any combination thereof. An input or output is a relative communication channel that can be used to receive or send data, respectively. A communication channel may be established as, for example, an IP protocol-based communications session using any suitable network infrastructure, including the Internet, any proprietary LAN, WAN, any other suitable network infrastructure, or any combination thereof. Inputs and outputs may be implemented as one or more physical ports, a data storage device, any other suitable hardware circuitry interface, software interface, or any combination thereof. For example, merchant system 400 may include a carrier input coupled to a carrier system and configured to receive data from the carrier system, a carrier output coupled to the carrier system and configured to output data to the carrier system, an aggregator input coupled to an aggregator system and configured to receive data from the aggregator system, an aggregator output coupled to the aggregator system and configured to output data to the aggregator system, a client device input coupled to a client device and configured to receive data from the client device, a client device output coupled to the client device and configured to output data to the client device, any other suitable input or output, or any combination thereof. In the context of the present disclosure, it may be preferential for merchant system 400 to not include a carrier input and a carrier output. That is, merchant system 400 need not be able to communicate with a carrier system in preferred embodiments of the present disclosure. While different inputs and outputs are described, it will be understood that they need not be separate components and two or more of the inputs and/or outputs may, indeed be implemented as a single component that can be used to send or receive data relative to more than one destination or source, respectively. Examples of communication circuitry 402 include transceivers such as a network port (e.g., an Ethernet port), a WiFi card, or any other suitable device or circuitry which facilitates communication with other systems and devices.

Storage system 416 may include any suitable hardware, software, or both for implementing an organized data storage system capable of storing one or more databases and information related to, for example, merchant data, client device data, user data, authentication, rules, and carrier data. For example, storage system 416 may include database 414. In some embodiments, storage system 416 may store information which is not stored in database 414, such as information related to merchant data, for example APIs, HTML for content pages, any other suitable information, and any combination thereof.

Database 414 may include one or more data storage systems capable of storing information related to, for example, merchant data, client device data, user data, and carrier data. Information related to merchant data may include, for example, APIs, HTML for content pages, merchant identification information, payload information, data related to criteria for revoking authentication, any other merchant data, or any combination thereof. Information related to client device data may include, for example, a mobile device number, identification information associated with a client device, any other client device data, or any combination thereof. Information related to user data may include, for example, authentication information for an authenticated user, credential information for an authenticated user, any other user related information, or any combination thereof. Carrier data may include, for example, the carrier network associated with a client device. In some embodiments, database 414 may store information in an encrypted form. For example, hashed information may be generated using a hash operation, and the hashed information may be stored in database 414.

Processing equipment 412 may be configured to process data received from other systems and devices (e.g., a client device, an aggregator system, or any other suitable system or device), process data to be output to other systems and devices, generate data, analyze data (e.g., confirm authentication information provided by a client device), and perform other tasks. In some embodiments, processing equipment 412 may include one or more circuitries for performing the functionality as described herein, such as user account management circuitry 404, encryption circuitry 406, request processing circuitry 408, transaction processing circuitry 410, any other suitable processing equipment, or any combination thereof. The circuitries within processing equipment 412 may communicate with one another to implement the features described herein. Additionally, the circuitries within processing equipment 412 may all be implemented together on one or more devices. Processing equipment 412 may communicate with communication circuitry 402 and database 414 to retrieve and/or transmit information. For example, processing equipment 412 may retrieve credential information associated with a user in possession of a client device from database 414 before allowing a transaction to be made on the client device. Processing equipment 412 may be any suitable software, hardware circuitry, or both sufficient to implement the circuitries within.

User account management circuitry 404 may be configured with any suitable software, hardwired instructions, or both to manage user information and transactions associated with the users. For example, user account management circuitry 404 may be at least a portion of one or more integrated circuit processors. In some embodiments, user information and transaction information may be received, for example, by an aggregator system, such as aggregator system 300, which is configured to attract and engage new users for merchant system 400. The aggregator system may communicate the user information and transaction information to merchant system 400, and merchant system 400 may receive the information using communication circuitry 402. Communication circuitry 402 may communicate the information to user account management circuitry 404. In some embodiments, user account management circuitry 404 may be configured to associate information related to a transaction with information for a user who engaged in the transaction, such that the user may gain access to benefits associated with a transaction. For example, account management circuitry 404 may receive information associated with a user, may separately receive information associated with a transaction for a healthcare membership made by the user, and may associate the transaction with the user such that the user is granted access to the healthcare membership benefits. Account management circuitry 404 may transmit and receive information to and from database 414. For example, account management circuitry 404 may associate user related information with received transaction related information, and may transmit the associated user and transaction related information to database 414.

Encryption circuitry 406 may be configured with any suitable software, hardwired instructions, or both to encrypt, decrypt, or both information such as, for example, a payload, information to be stored in database 414, any other suitable information, or any combination thereof. For example, encryption circuitry 406 may be at least a portion of one or more integrated circuit processors. Encrypting information may protect the information from being stolen, hacked, or otherwise leaked to a source which does not have permission to access the information. In some embodiments, information may be encrypted using an encryption key, such as a symmetric key, an asymmetric key, any other suitable encryption method, or any combination thereof. For example, an aggregator system may provision a merchant system with an encryption key, and the merchant system may use the encryption key to encrypt information. In some embodiments, the advanced encryption standard (AES), or any other suitable strong symmetric-key block cipher, should be used when information is encrypted by encryption circuitry 406. In some embodiments, information to be encrypted may include a payload generated by payload generation circuitry 404. Merchant system 400 may pass a payload encrypted by encryption circuitry 406 to a client device, and the encrypted payload may facilitate client-initiated interaction between a client device and an aggregator system. An encrypted payload may be unique for a client device, but not unique for each request made by the client device.

Request processing circuitry 408 may be configured with any suitable software, hardwired instructions, or both to process requests from other systems and devices, for example, carrier system 104 of FIG. 1, aggregator system 100 of FIG. 1, or client device 106 of FIG. 1. For example, request processing circuitry 408 may be at least a portion of one or more integrated circuit processors. Requests may include a request to output information, such as identification information or authentication information, a request to accept information, any other suitable request, or any combination thereof. In some embodiments, one or more requests may be received by communication circuitry 402 and passed from communication circuitry 402 to request processing circuitry 408. Request processing circuitry 408 may determine an appropriate response to each of the one or more requests, for example, processing information, generating information, analyzing information, communicating with another circuitry within processing equipment 412, transmitting data to database 414, receiving data from database 414, any other appropriate response, or any combination thereof. In some embodiments, request processing circuitry may process, respond to, or both, requests received from other circuitries within processing equipment 412.

Transaction processing circuitry 410 may be configured with any suitable software, hardwired circuitry, or both to process a transaction made on a client device. For example, transaction processing circuitry 410 may be at least a portion of one or more integrated circuit processors. Processing a transaction may include, for example, submitting payment information, completing a sale, any other suitable process, or any combination thereof. A transaction may be a purchase transaction, a registration, any other suitable process, or any combination thereof. In some embodiments, transaction processing circuitry 410 may use data stored in database 414 to process a transaction. In other embodiments, transaction processing circuitry 410 may use data received from another system, such as an aggregator system, to process a transaction. For example, a client device may visit a website associated with merchant system 400 to make a purchase transaction, and merchant system 400 may receive information from an aggregator system, such as aggregator system 100 of FIG. 1, to process the purchase transaction. In some embodiments, transaction processing circuitry 410 may pre-populate transaction data fields with information received from another system or device, or information received form database 414.

Figure 5:
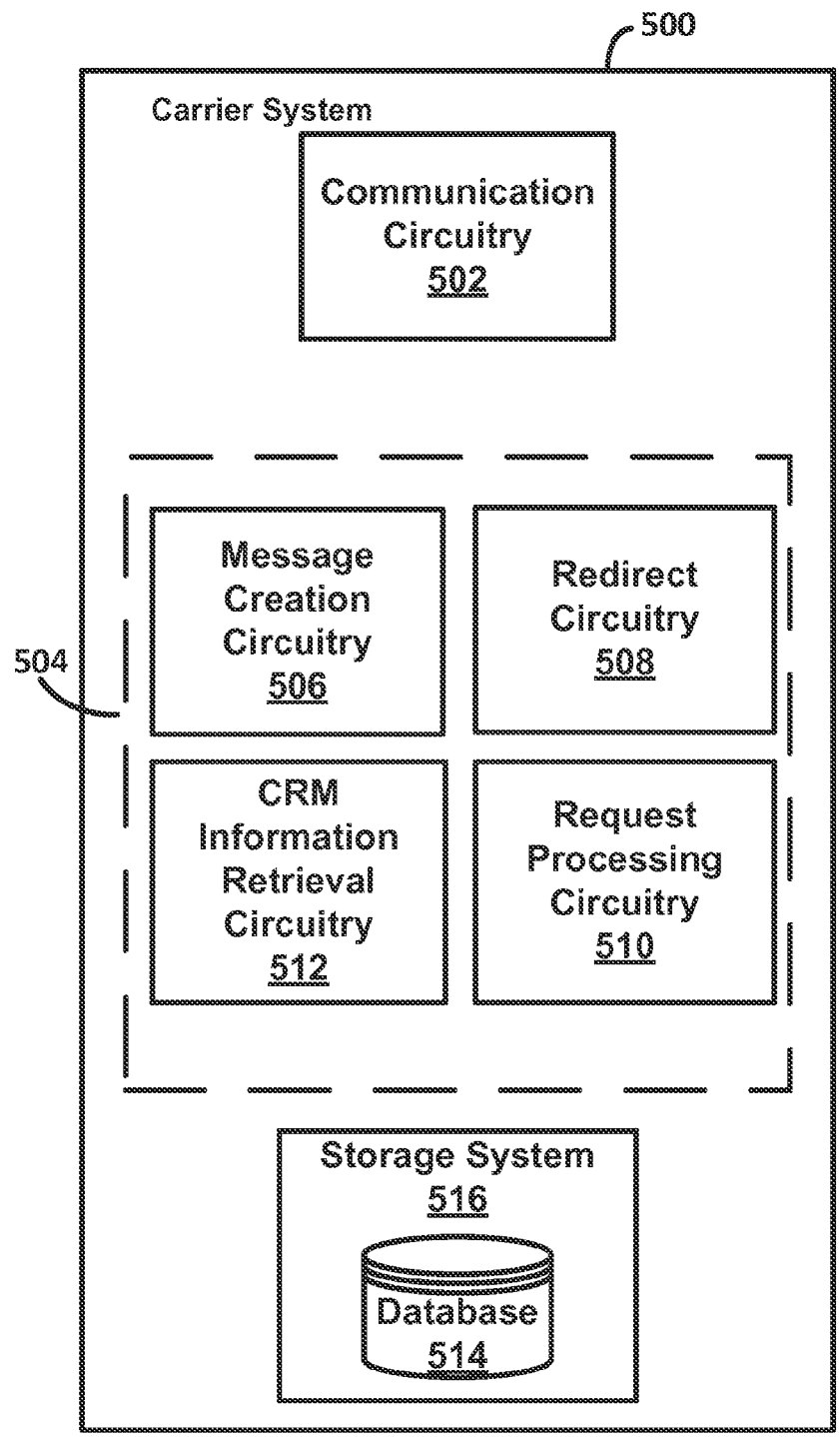
FIG. 5 is a block diagram of an illustrative carrier system in accordance with some embodiments of the present disclosure.

FIG. 5 is a block diagram of illustrative carrier system 500 in accordance with some embodiments of the present disclosure. Carrier system 500 may be any suitable carrier system, such as carrier system 208 of FIG. 2 or carrier system 104 of FIG. 1. In some embodiments, carrier system 500 may be implemented in a network environment, such as that of FIG. 1. Carrier system 500 may include any suitable software, hardware circuitry, or both configured to implement the features as described herein. For example, carrier system 500 may include server hardware circuitry and software. Carrier system 500 may include communication circuitry 502, storage system 516, and processing equipment 516.

Communication circuitry 502 may be configured with any suitable software, hardwired instructions, or both to communicate with database 514 and processing equipment 516, and may include inputs, outputs, any other mechanisms which facilitate communication with other systems and devices, or any combination thereof. An input or output is a relative communication channel that can be used to receive or send data, respectively. A communication channel may be established as, for example, an IP protocol-based communications session using any suitable network infrastructure, including the Internet, any proprietary LAN, WAN, any other suitable network infrastructure, or any combination thereof. Inputs and outputs can be implemented as one or more physical ports, a data storage device, any other suitable hardware circuitry interface, software interface, or any combination thereof. For example, carrier system 500 may include an aggregator input coupled to an aggregator system and configured to receive data from the aggregator system, an aggregator output coupled to the aggregator system and configured to output data to the aggregator system, a merchant input coupled to a merchant system and configured to receive data from the merchant system, a merchant output coupled to the merchant system and configured to output data to the merchant system, a client device input coupled to a client device and configured to receive data from the client device, a client device output coupled to the client device and configured to output data to the client device, any other suitable input or output, or any combination thereof. In the context of the present disclosure, it may be preferential for carrier system 500 to not include a merchant input and a merchant output. That is, carrier system 500 need not be able to communicate with a merchant system in preferred embodiments of the present disclosure. While different inputs and outputs are described, it will be understood that they need not be separate components and two or more of the inputs and/or outputs may, indeed be implemented as a single component that can be used to send or receive data relative to more than one destination or source, respectively. Examples of communication circuitry 502 include transceivers such as a network port (e.g., an Ethernet port), a WiFi card, or any other suitable device or circuitry which facilitates communication with other systems and devices.

Storage system 516 may include any suitable hardware, software, or both for implementing an organized data storage system capable of storing one or more databases and information related to, for example, account data, rules, and CRM information associated with a user in possession of a client device. For example, storage system 516 may include database 514. In some embodiments, storage system 516 may store information which is not stored in database 514, and carrier system 500 may be configured to communicate such information to a trusted aggregator system, such as aggregator system 300.

Database 514 may include one or more data storage systems capable of storing information related to, for example, account data and CRM information associated with a user in possession of a client device. In some embodiments, database 514 may store information in an encrypted form. For example, hashed information may be generated using a hash operation, and the hashed information may be stored in database 514.

Processing equipment 504 may be configured to process data received from other systems and devices (e.g., a client device, an aggregator system, or any other suitable system or device), process data to be output to other systems and devices (e.g., CRM information), and perform other tasks. In some embodiments, processing equipment 504 may include one or more circuitries for performing the functionality as described herein, such as message creation circuitry 506, redirect circuitry 508, request processing circuitry 510, CRM information retrieval circuitry 512, any other suitable processing equipment, or any combination thereof. The circuitries within processing equipment 504 may communicate with one another to implement the features as described herein. Additionally, the circuitries within processing equipment 504 may be implemented together on one or more devices. Processing equipment 504 may be configured to communicate with communication circuitry 502 and database 514 to retrieve and/or transmit information related to user account data, CRM information, any other information, or any combination thereof. Processing equipment 504 may be any suitable software, hardware circuitry, or both sufficient to implement the circuitries within.

Message creation circuitry 506 may be configured with any suitable software, hardwired instructions, or both to create a message such as, for example, a short message service (SMS) message, a silent SMS message, any other suitable type of message, or any combination thereof. For example, message creation circuitry 506 may be at least a portion of one or more integrated circuit processors. In some embodiments, message creation circuitry 506 may be configured to generate an SMS message in response to a request from another system or device, such as aggregator system 100 of FIG. 1 or client device 106 of FIG. 1. For example, carrier system 500 may receive a request to generate an SMS message and send it to a client device, and message creation circuitry may create the SMS message and may specify that the message should be sent to the mobile phone number of the client device.

Redirect circuitry 508 may be configured with any suitable software, hardwired instructions, or both to redirect, for example, a request, information, or both from one location (e.g., a system) to another. For example, redirect circuitry 508 may be at least a portion of one or more integrated circuit processors. In some embodiments, redirect circuitry 508 may be configured to redirect an SMS message from one system or device to another system or device. In other embodiments, redirect circuitry 508 may be configured to perform an http redirect from a website associated with one system to a website associated with another system. Redirect circuitry 508 may additionally be configured to perform any other suitable redirect from one system to another. In some embodiments, redirect circuitry 508 may receive instructions which cause the redirect to be performed. In some embodiments, redirect circuitry 508 may receive such instructions from request processing circuitry 510.

Request processing circuitry 510 may be configured with any suitable software, hardwired instructions, or both to process requests from other systems and devices, for example, aggregator system 100 of FIG. 1 or client device 106 of FIG. 1. For example, request processing circuitry 510 may be at least a portion of one or more integrated circuit processors. Requests may include a request for information, such as user account information or CRM information, any other suitable request, or any combination thereof. One or more requests may be received by communication circuitry 502 and passed from communication circuitry 502 to request processing circuitry 510. Request processing circuitry 510 may determine an appropriate response to each of the one or more requests, such as processing information, communicating with another circuitry within processing equipment 504, transmitting data to database 514, receiving data from database 514, any other appropriate response, or any combination thereof. In some embodiments, request processing circuitry 510 may process, respond, or both to requests received from other circuitries within processing equipment 504.

CRM information retrieval circuitry 512 may be configured with any suitable software, hardwired circuitry, or both to retrieve CRM information associated with a client device. For example, CRM information retrieval circuitry 512 may be at least a portion of one or more integrated circuit processors. In some embodiments, CRM information may include information related to an account associated with a user in possession of a client device (e.g., payment information, name, address, social security number, etc.), or any other suitable information which may be obtained through interactions between carrier system 500 and a client device. CRM information retrieval circuitry 512 may be configured to retrieve appropriate CRM information from database 514. In some embodiments, CRM information retrieval circuitry 512 may be configured to retrieve appropriate CRM information in response to a request received from request processing circuitry 510. For example, an aggregator system, such as aggregator system 100 of FIG. 1, may request CRM information associated with an identified client device from carrier system 500, and CRM information retrieval circuitry 512 may retrieve the requested CRM information and provide it to communication circuitry 502 to be output to the aggregator system.

Figure 6:
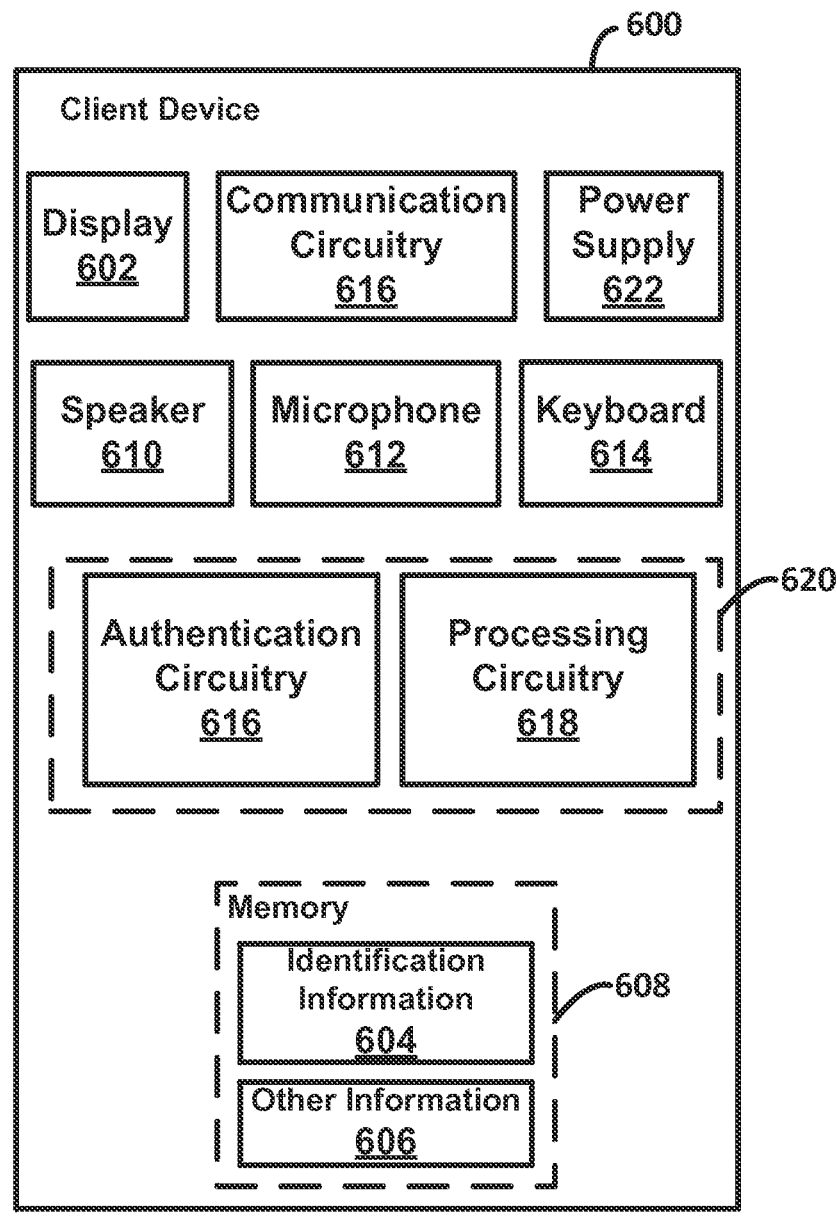
FIG. 6 is a block diagram of an illustrative client device in accordance with some embodiments of the present disclosure.

FIG. 6 is a block diagram of illustrative client device 600 in accordance with some embodiments of the present disclosure. Client device 600 may be any suitable client device, such as client device 206 of FIG. 2 or client device 106 of FIG. 1. In some embodiments client device 600 may be implemented in a network environment, such as that of FIG. 1. Client device 600 may include any suitable software, hardware circuitry, or both configured to implement the features as described herein. Client device 600 may include display 602, communication circuitry 616, power supply 622, speaker 610, microphone 612, keyboard 614, memory 608, and processing equipment 620.

Display 602 may be configured to display any information stored on or received by client device 600 in any suitable format. Information displayed may include, for example, information requested by a user of client device 600, information related to client device 600, information related to a transaction, information related to an mobile application, information received from another system or device, information to be sent to another system or device, an SMS message, any other suitable information, or any combination thereof. Display 602 may be, for example, a flat panel display such as a liquid crystal display, plasma display, any other suitable display, or any combination thereof.

Power supply 622 may be configured to supply power to client device 600. Power supply 622 may be any suitable internal or external power source such as, for example, a battery.

Speaker 610 may be configured to provide audible sound. The audible sound may be related to a phone call on client device 600, an application running on client device 600, an alarm set on client device 600, a transaction, any other suitable process or application, or any combination thereof.

Microphone 612 may be configured to receive user input such as, for example, audible user input. The inputs received by microphone 612 may include information related to, for example, a phone call on client device 600, a user in possession of client device 600, a transaction, any other suitable information, or any combination thereof.

Keyboard 614 may be configured to receive user input such as, for example, text input. The inputs received by keyboard 614 may be information related to, for example, a message stored on or created on client device 600, a user in possession of client device 600, a transaction, any other suitable information, or any combination thereof.

Communication circuitry 616 may include inputs, outputs, any other mechanisms which facilitate communication with other systems and devices, or any combination thereof. Communication circuitry 616 may be configured with any suitable software, hardwired instructions, or both. An input or output is a relative communication channel that can be used to receive or send data, respectively. A communication channel may be established as, for example, an IP protocol-based communications session using any suitable network infrastructure, including the Internet, any proprietary LAN, WAN, any other suitable network infrastructure, or any combination thereof. Inputs and outputs can be implemented as one or more physical ports, a data storage device, any other suitable hardware circuitry interface, software interface, or any combination thereof. For example, client device 600 may include a carrier input coupled to a carrier system and configured to receive data from the carrier system, a carrier output coupled to the carrier system and configured to output data to the carrier system, a merchant input coupled to a merchant system and configured to receive data from the merchant system, a merchant output coupled to the merchant system and configured to output data to the merchant system, an aggregator input coupled to an aggregator system and configured to receive data from the aggregator system, an aggregator output coupled to the aggregator system and configured to output data to the aggregator system, any other suitable input or output, or any combination thereof. While different inputs and outputs are described, it will be understood that they need not be separate components and two or more of the inputs and/or outputs may, indeed be implemented as a single component that can be used to send or receive data relative to more than one destination or source, respectively. Examples of communication circuitry 616 include transceivers such as a network port (e.g., an Ethernet port), a WiFi card, or any other suitable device or circuitry which facilitates communication with other systems and devices. Communication circuitry 616 may be configured to communicate with memory 608, processing equipment 620, speaker 610, microphone 612, keyboard 614, power supply 622, and display 602.

Memory 608 may be one or more suitable memory devices such as, for example, a hard disk drive, flash memory, RAM, an optical disk, any other suitable memory device, or any combination thereof. Memory 608 may include identification information 604 and other information 606. Identification information 604 may include any suitable identification information related to client device 600. For example, identification information 604 may include hardware circuitry or software information associated with client device 600, a mobile phone number associated with client device 600, device model related information associated with client device 600, information related to a user in possession of client device 600, information related to a carrier system associated with client device 600, any other suitable identification information, or any combination thereof. Other information 606 may include any information stored in memory 608 other than identification information 604. For example, other information 606 may store information related to applications, messaging, photos and videos, transactions, merchants, networks, capacity and storage, any other suitable information, or any combination thereof.

Processing equipment 620 may be configured to process data received from other systems and devices (e.g., a merchant system, a carrier system, an aggregator system, or any other suitable system or device), process data to be output to other systems and devices, process data related to mobile applications, and perform other tasks. In some embodiments, processing equipment 620 may include one or more circuitries for performing the functionality as described herein, such as authentication circuitry 616, processing circuitry 618, any other suitable processing equipment, or any combination thereof. The circuitries within processing equipment 620 may communicate with one another to implement the features as described herein. Additionally, the circuitries within processing equipment 620 may all be implemented together on one or more devices. Processing equipment 620 may be configured to communicate with communication circuitry 616, memory 608, speaker 610, microphone 612, keyboard 614, power supply 622, and display 602. Processing equipment 620 may be any suitable software, hardware circuitry, or both sufficient to implement the circuitries within.

Authentication circuitry 616 may be configured with any suitable software, hardwired instructions, or both to authenticate client device 600. For example, authentication circuitry 616 may be at least a portion of one or more integrated processors. In some embodiments, authenticating client device 600 may include authenticating a user in possession of client device 600. In some embodiments, authentication circuitry 616 may communicate with a system, such as a merchant system or an aggregator system, via communication circuitry 616, in order to authenticate client device 600. Authenticating client device 600 may include prompting a user in possession of client device 600 to input information. Information may be input via display 602, keyboard 614, microphone 612, any other suitable user input, or any combination thereof. Information may include, for example, uniquely identifying information related to the user in possession of client device 600. In some embodiments, authentication circuitry 616 may communicate with memory 608 to authenticate client device 600. For example, memory 608 may store information received from an aggregator system, such as aggregator system 100 of FIG. 1, and subsequent to prompting a user in possession of client device 600 for information, authentication circuitry 616 may compare the entered information to that stored in memory 608.

Processing circuitry 618 may be configured with any suitable software, hardwired instructions, or both to implement any features other than authentication. For example, processing circuitry 618 may be at least a portion of one or more integrated circuit processors. For example, processing circuitry 618 may be configured to run applications, to compute information, to process instructions, to carry out functions related to client device operation, to carry out any other suitable operation or implementation, or any combination thereof.

Figure 7:
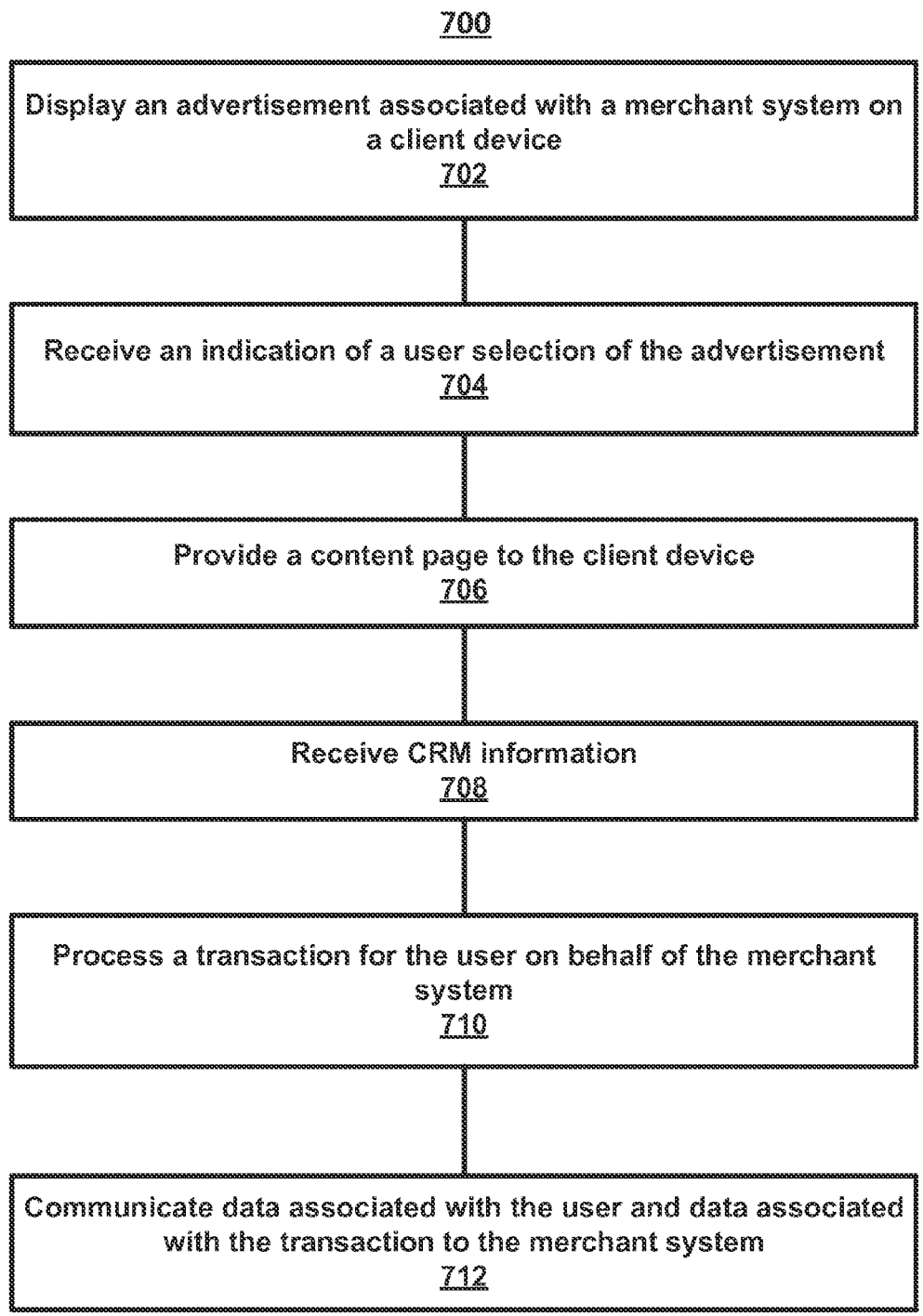
FIG. 7 is a flow diagram including illustrative steps for outputting data corresponding to a user and data corresponding to a transaction in accordance with some embodiments of the present disclosure.

FIG. 7 is a flow diagram including illustrative steps 700 for outputting data corresponding to a user and data corresponding to a transaction to a merchant system in accordance with some embodiments of the present disclosure. In some embodiments, the steps 700 may be performed by an aggregator system, such as aggregator system 100 of FIG. 1, aggregator system 202 of FIG. 2, or aggregator system 300 of FIG. 3.

At step 702 the aggregator system may cause an advertisement associated with a merchant system to be displayed on a client device. In some embodiments, the client device may be associated with a user. The advertisement may be provided by processing equipment such as advertising circuitry 316 of FIG. 3 or MCAP 306 of FIG. 3. The advertisement may include information associated with a merchant system such as, for example, the promotion of a product or service provided by the merchant system. In some embodiments, the advertisement may be targeted to be delivered to specific subset of users based on one or more parameters such as, for example, the carrier system associated with the respective client devices of the users, information related to the age of the users, information related to the gender of the users, information related to the geographic location of the users, any other suitable parameters, or any combination thereof. For example, an advertisement related to the promotion of an online dating membership provided by a merchant system may be targeted to be delivered to client devices belonging to females between the ages of twenty and twenty-four.

At step 704 the aggregator system may receive an indication of a user selection of the advertisement displayed at step 702. A user selection may include, for example, a user clicking on the advertisement. In some embodiments, the indication of a user selection may be received by the aggregator system using communication circuitry 302 of FIG. 3. For example, at step 702 an aggregator system may deliver and cause to be displayed on a user's client device an advertisement related to the promotion of a healthcare membership provided by a merchant system, and at step 704 the aggregator system may receive an indication at a client device input that the user selected the advertisement related to the promotion of the healthcare membership.

At step 706 the aggregator system may provide a content page to the client device. The content page may be, for example, a webpage, and may be provided in response to the indication of a user selection of the advertisement received at step 704. The aggregator system may provide the content page using processing equipment, such as MCAP 306 of aggregator system 300. The content page may include additional information related to the product or service being promoted by the advertisement selected, as well as data fields related to user information and information required to process a purchase transaction required to receive the product or service being promoted in the selected advertisement. For example, in response to a user selection of an advertisement related to the promotion of an online dating service provided by a merchant system, the aggregator system may provide a content page to the user's client device that includes additional pricing details about the online dating service being promoted as well as data fields that must be completed to process a payment required to participate in the online dating service.

At step 708 the aggregator system may receive CRM information. The aggregator system may receive CRM information from a carrier system associated with the client device of the user, and may receive the CRM information using, for example, communication component 302 of FIG. 3. In some embodiments, the aggregator system may receive CRM information in response to a request made by the aggregator system. The CRM information may be associated with the user, and the user may have been identified by the aggregator system prior to the aggregator system receiving the CRM information.

At step 710 the aggregator system may process a transaction for the user on behalf of the merchant system. In some embodiments, the transaction may be processed by the aggregator system based on the CRM information associated with the user. Processing the transaction may include, for example, registering the user with a new account with the merchant system, processing a payment for the user on behalf of the merchant system, or both. In some embodiments, the aggregator system may process the transaction by pre-populating data fields related to the transaction included in the content page provided at step 706. For example, a user may select an advertisement for the promotion of a product or service provided by a merchant through an associated merchant system, the aggregator system may identify the user based on the user's client device, the aggregator may deliver a content page including data fields related to a payment required to receive the product or service being promoted by the advertisement to the user's client device, and the aggregator system may pre-populate the data fields and process the payment for the user on behalf of the merchant system.

At step 712 the aggregator system may communicate data associated with the user and data associated with the transaction to the merchant system. In some embodiments, data associated with the user may include at least a subset of the CRM information associated with the user, and data associated with the transaction may include details related to a payment or payment information. The aggregator system may communicate data, for example, using communication circuitry 302 of FIG. 3.

Figure 8:
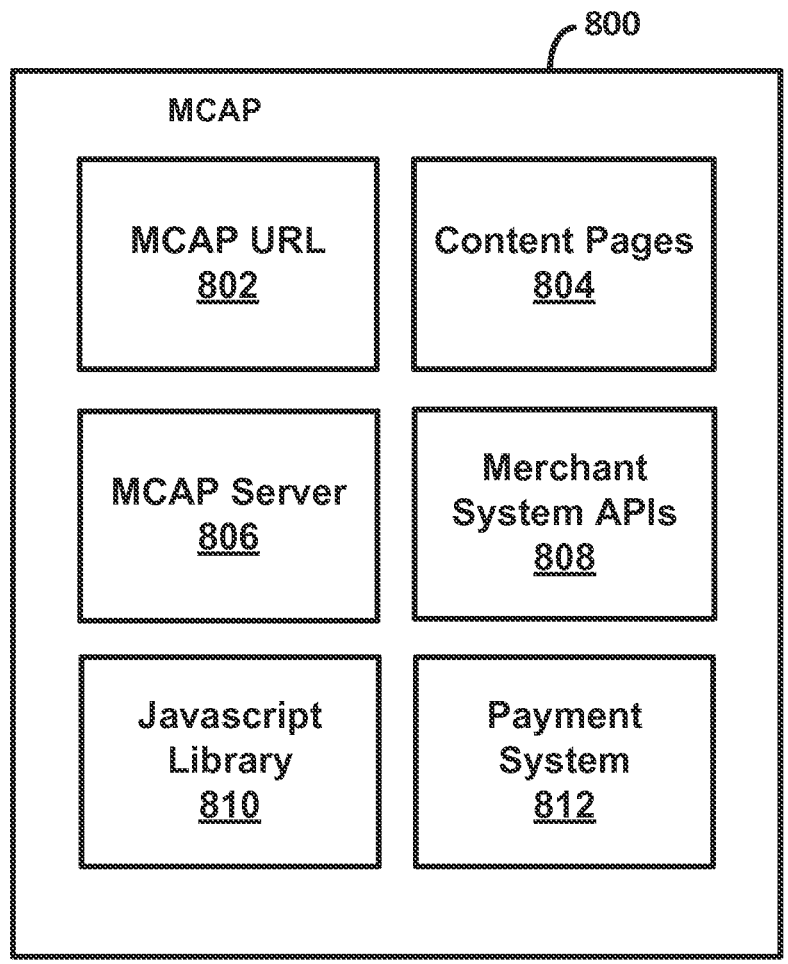
FIG. 8 is a block diagram of an illustrative mobile customer acquisition platform (MCAP) in accordance with some embodiments of the present disclosure.

FIG. 8 is a block diagram of illustrative MCAP 800 in accordance with some embodiments of the present disclosure. In some embodiments, MCAP 800 may be MCAP 306 of aggregator system 300. MCAP 800 may be any suitable software, hardware circuitry, or both configured to provide an integrated platform that allows an aggregator system to perform functions on behalf of a merchant system and to engage users in connection with a product or service provided by the merchant system. In some embodiments, MCAP 800 may include one or more components for performing the functionality as described herein, such as MCAP URL 802, content pages 804, MCAP server 806, merchant system APIs 808, Javascript library 810, payment system 812, any other suitable components or processing equipment, or any combination thereof. The components within MCAP 800 may communicate with one another to implement the features described herein.

MCAP URL 802 may be a URL that is called in response to a user selection of an advertisement. The MCAP URL call may include parameters that identify the advertisement selected. The MCAP URL may be called by an aggregator system, such as aggregator system 300, or any other suitable processing equipment or entity. In some embodiments, the aggregator system may call the MCAP URL to request MCAP 800 to provide a content page to a client device in response to a user selection of an advertisement. The MCAP URL need not provide any content, but rather redirects the web browser of the client device to the URL associated with the content page.

Content pages 804 may be provided by MCAP 800 in response to a call to the MCAP URL. Content pages may be, for example, webpages, and may be displayed on a client device using a web browser. Content pages may provide additional information related to a product or service being promoted by an advertisement, and may be provided by MCAP 800 in response to a user selection of the advertisement. For example, a user may select on a client device an advertisement for the promotion of an online dating service membership, an aggregator system may call the MCAP URL and the call may identify the online dating service membership being promoted, the MCAP URL may redirect the web browser of the client device to the URL of a content page, and the content page may provide additional pricing information related to the online dating service membership being promoted and data fields that must be completed to receive the online dating service membership.

MCAP server 806 may be any suitable software, hardware circuitry, or both configured to host and implement the features described with respect to the MCAP URL and the content pages, and to call APIs included in the content pages. In some embodiments, MCAP server 806 may enable the MCAP URL to redirect the web browser of a client device to a URL associated with a content page. In some embodiments, the MCAP server may enable APIs included in the content pages to be called to process a transaction.

Merchant system APIs 808 may allow the content pages to perform actions on behalf of a merchant system. Merchant system APIs 808 may be, for example, APIs stored by aggregator system 300. In some embodiments, these actions may include, for example, processing a transaction, requesting data from the merchant system, any other suitable action, or any combination thereof. For example, a content page may include data fields required to process a user registration, and when the data fields are completed, a merchant system API may register the user.

Javascript library 810 may include one or more data storage systems capable of storing information related to merchant system APIs 808. In some embodiments, Javascript library 810 may be included in content pages, such that the merchant system APIs 808 stored in Javascript library 810 may be called by the content pages to perform actions on behalf of a merchant system. Specifically, merchant system APIs 808 may be called by code written in Javascript, by code written in any other suitable computer programming language, or by any other suitable process or software in the aggregator system or in MCAP 800.

Payment system 812 may be any suitable software, hardware circuitry, or both configured to process a payment for a user on behalf of a merchant system. Payment system 812 may be requested to process a payment for a user based on completed data fields in a content page. In some embodiments, the content page may include code, which when executed, is configured to initiate the payment processing performed by payment system 812.

Figure 9:
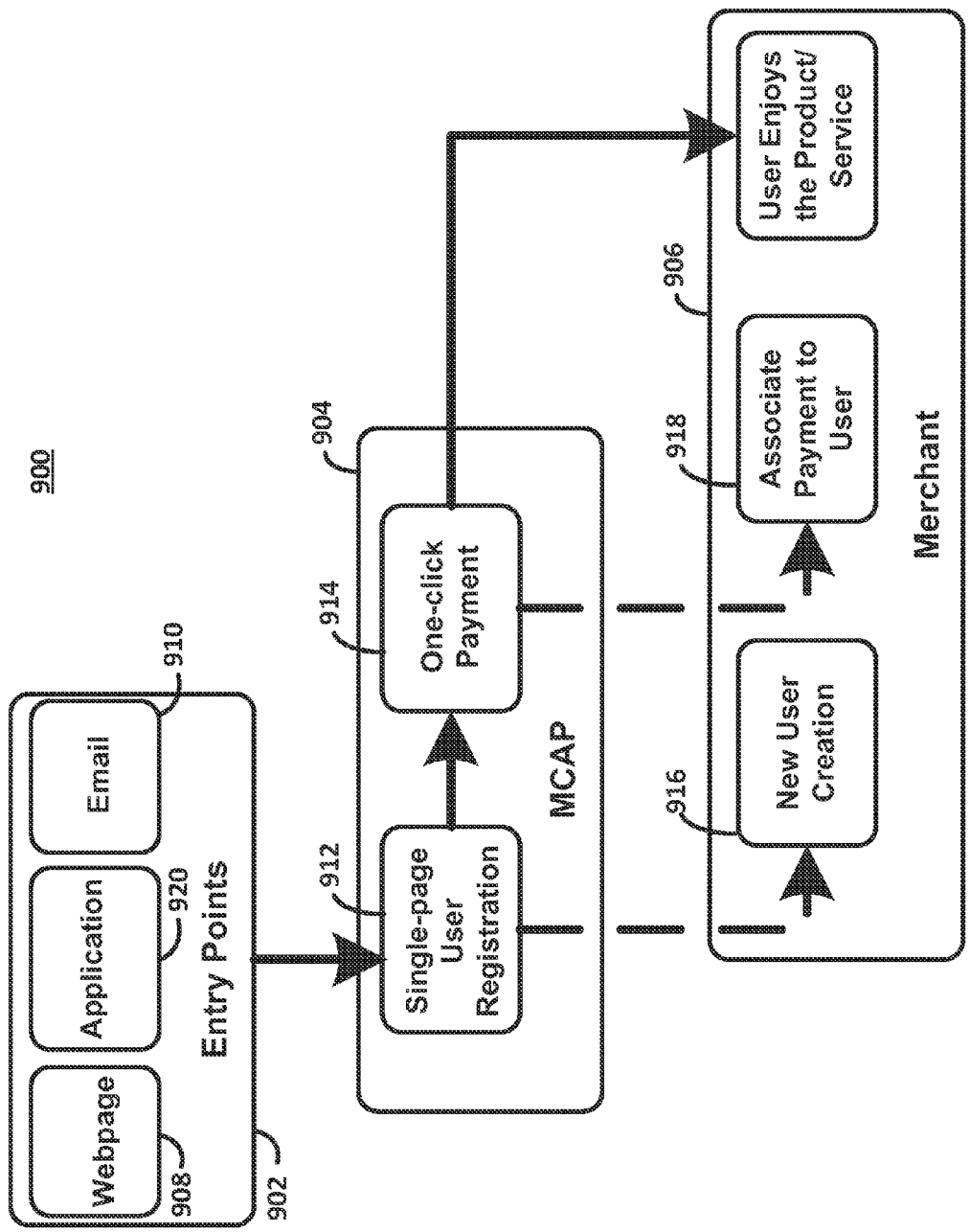
FIG. 9 is a block diagram showing an illustrative process flow for attracting and engaging a new user in accordance with some embodiments of the present disclosure.

FIG. 9 is a block diagram showing an illustrative process flow 900 for acquiring a new user in accordance with some embodiments of the present disclosure. Entry points 902 may include any suitable application, webpage, promotional email, or other content page capable of providing and displaying advertisements associated with a merchant system on a client device. The advertisements may include information related to, for example, a promotion of a product or service provided by the merchant system. The advertisements may be delivered to the client device by, for example, advertising circuitry 316 of aggregator system 300, and may be displayed by the client device. In some embodiments, an aggregator system may use an advertising network to deliver advertisements, such that they appear on a webpage, for example, webpage 908. For example, advertising circuitry 316 of aggregator system 300 may use an advertising network to access a website that hosts advertisements, and may publish one or more advertisements on the webpage. Advertisements may additionally be displayed in a promotional email on the client device, such as email 910. In some embodiments, a client device may include an application, such as application 920, which may communicate with an aggregator system to provide and display advertisements on the client device. For example, a client device may include an application which displays advertisements related to weekly grocery discounts offered by a merchant system, where the advertisements are provided to the application by an aggregator system. The advertisements presented by webpage 908, application 920, and email 910 may include advertisements that are targeted to be delivered to a specific subset of users based on one or more parameters, such as the carrier system associated with the respective client devices of the users, information related to the age of the users, information related to the gender of the users, information related to the geographic location of the users, any other suitable parameters, or any combination thereof.

When a user selects an advertisement on the client device by, for example, clicking on the advertisement, a content page may be provided to the client device by MCAP 904. MCAP 904 may be any suitable MCAP, such as MCAP 800 of FIG. 8 or MCAP 306 of FIG. 3. MCAP 904 may provide a content page to be displayed on the client device based on the user selection of an advertisement at entry points 902. The content page provided may be, for example, single-page user registration 912. Single-page user registration 912 may include data fields related to information which must be completed to register the user with the merchant system. The data fields may be pre-populated by MCAP 904, for example, based on CRM information received from the carrier system associated with the client device of the user. In some embodiments, the client device may be identified, for example by identification circuitry 314 of FIG. 3, prior to receiving CRM information. The data fields may alternatively be filled out on the client device by the user. Upon completion of the data fields of single-page user registration 912, content page one-click payment 914 may be provided to and displayed by the client device. Content page one-click payment 914 may include data fields related to information required to process a payment on behalf of the merchant system to receive the product or service being promoted by the advertisement selected at entry points 902. The data fields may be pre-populated by MCAP 904, for example, based on CRM information received from the carrier system associated with the client device of the user. The data fields may alternatively be filled out on the client device by the user. The information related to the completed data fields of the single-page user registration 912 and the one-click payment 914 may be send to the merchant system, and the user may subsequently receive the product or service.

Merchant system 906 may be any suitable merchant system, such as merchant system 102 of FIG. 1, merchant system 204 of FIG. 2, or merchant system 400 of FIG. 4. Merchant system may receive the information related to the completed data fields of single-page user registration 912 and may create a new user at 916. For example, new user creation 916 may be performed by user account management circuitry 404 of FIG. 4. Merchant system may receive the information related to the completed data fields of one-click payment 914 and may associate the payment to the user at 918. For example, associate payment to user 918 may be performed by account management circuitry 404 of FIG. 4, and may include associating the payment with the user created at 916.

Figure 10:
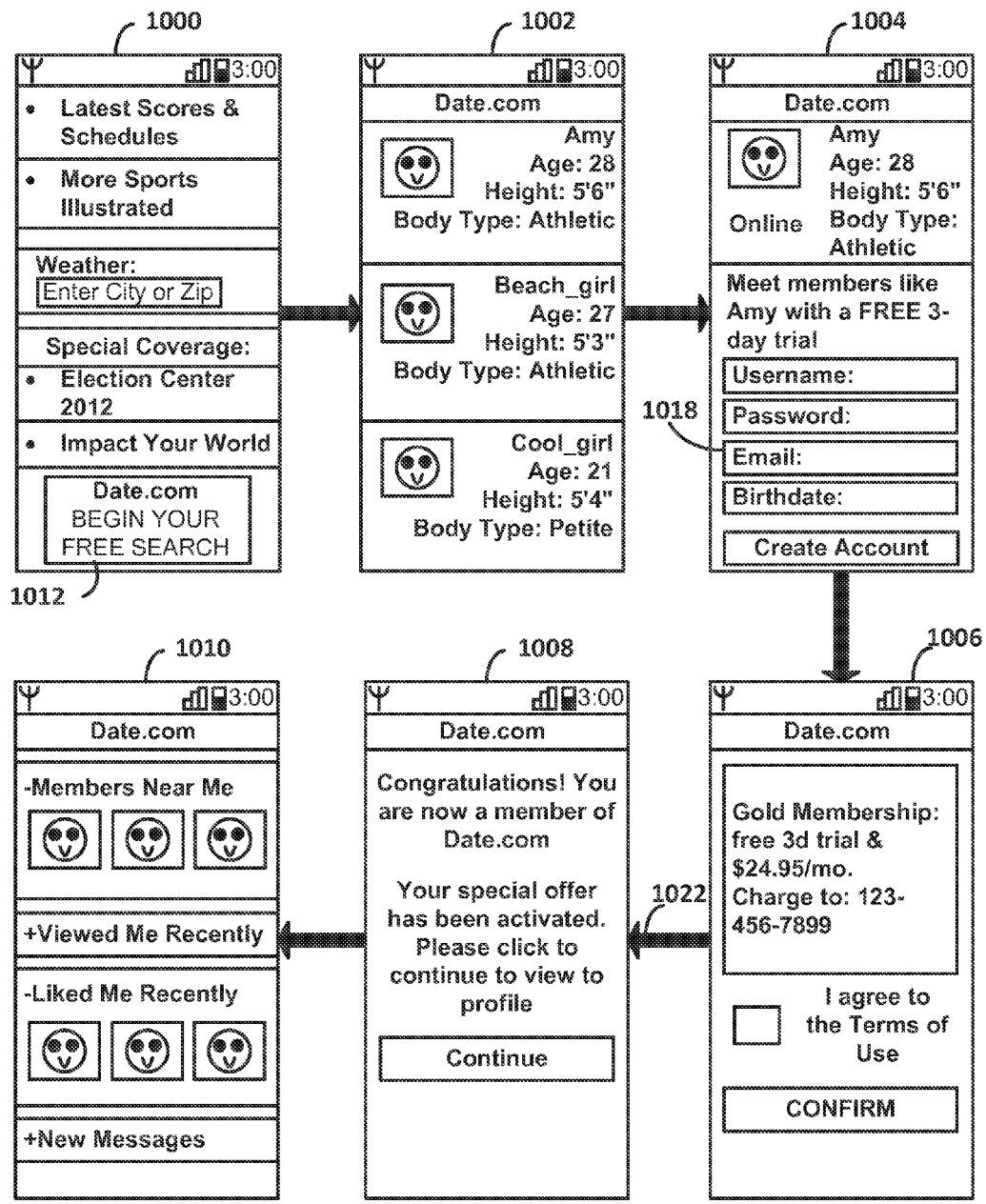
FIG. 10 shows a sequence of illustrative displays in which a user account is created and a payment is processed in accordance with some embodiments of the present disclosure.

FIG. 10 shows a sequence of illustrative displays in which a user account is created and a payment is processed in accordance with some embodiments of the present disclosure. Display 1000 may be a content page displayed on a client device associated with a user, and may include information associated with a webpage being viewed by the user. Advertisement 1012 may be placed in the webpage by, for example, aggregator system 300. Advertisement 1012 may include information related to the promotion of a product or service provided by a merchant through an associated merchant system. The user may select advertisement 1012 by, for example, clicking on the advertisement.

An aggregator system, such as aggregator system 300, may provide content page 1002 to the client device to be displayed based on the user selection of advertisement 1012. Content page 1002 may include additional information related to the product or service being promoted by advertisement 1012. Content page 1002 need not be a singular content page, and may instead be a series of content pages navigable by the user of the client device, for example, by selecting a content item in one content page to transition to another content page. For example, the user may select a dating profile displayed by content page 1002 and in response the aggregator system may provide content page 1004 to the client device to be displayed.

Content page 1004 may include data fields 1018 related to user information which must be completed in order to receive the product or service being promoted by advertisement 1012. Data fields 1018 may be pre-populated by the aggregator system, for example, based on CRM information received from a carrier system associated with the client device of the user. In some embodiments, the client device may be identified, for example by identification circuitry 314 of FIG. 3 prior to receiving CRM information. After data fields 1018 are pre-populated by the aggregator system, the user may select to create an account, and the aggregator system may provide content page 1006 to the client device to be displayed.

Content page 1006 may include pre-populated payment information, based on CRM information associated with the user received from the carrier system associated with the client device of the user. The payment information may be pre-populated by the aggregator system. The user may confirm the payment information on content page 1006, and the aggregator system may process the payment for the user on behalf of the merchant system at 1022.

The aggregator system may display content page 1008 based on the payment processed at 1022, where content page 1008 may include a confirmation that indicates that the user is now a registered user with the merchant system. The aggregator system may subsequently cause the web browser of the client device to be redirected to content page 1010, published by the merchant system, where content page 1010 contains content related to the purchase made by the user.

It will be understood that the steps above are exemplary and that in some implementations, steps may be added, removed, omitted, repeated, reordered, modified in any other suitable way, or any combination thereof.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An aggregator system comprising:
a carrier input coupled to a carrier system and configured to receive customer relationship management (CRM) information from the carrier system;
a client device input coupled to a client device associated with a user configured to receive an indication of a user selection of a selectable option;
a merchant output coupled to a merchant system and configured to provide data associated with the user to the merchant system; and
a mobile customer acquisition platform (MCAP) coupled to the carrier input, the client device input, and the merchant output, and configured to:
cause to be displayed on the client device a selectable option associated with the merchant system;
provide a content page to the client device in response to the user selection of the selectable option;
retrieve from the carrier system CRM information associated with the user in response to the user selection of the selectable option;
process a transaction for the user on behalf of the merchant system based at least in part on the CRM information, and
communicate data associated with the user and data associated with the transaction to the merchant system.

2. The aggregator system of claim 1, wherein the selectable option comprises a displayed selectable advertisement associated with the merchant system and displayed on behalf of the merchant system.

3. The aggregator system of claim 1, wherein the content page comprises one or more fillable data fields and wherein the MCAP is further configured to pre-populate at least one of the one or more data fields based at least in part on the CRM information.

4. The aggregator system of claim 1, wherein the transaction is one of a payment transaction, a registration transaction, and a combination thereof.

5. The aggregator system of claim 1, wherein the MCAP is further configured to cause the client device to display a content page published by the merchant system in response to the transaction being processed.

6. The aggregator system of claim 1, further comprising identification circuitry configured to identify the client device.

7. The aggregator system of claim 1, further comprising a database configured to store the data associated with the transaction.

8. The aggregator system of claim 1, further comprising a network interface that couples a communications network to the carrier input, the client device input, and the merchant output.

9. The aggregator system of claim 1, further comprising a database of application programming interfaces (APIs) that allow the aggregator system to process the transaction on behalf of the merchant system.

10. A method comprising, using an aggregator system for:
displaying, using a mobile customer acquisition platform (MCAP) of the aggregator system, a selectable option associated with a merchant system on a client device associated with a user;
receiving at a client device input of the aggregator system, an indication of a user selection of the selectable option at a client device;
providing, using the MCAP, a content page to the client device based on the user selection of the selectable option;
receiving, at a carrier system input of the aggregator system, customer relationship management (CRM) information from the carrier system;
processing, using the MCAP, a transaction for the user on behalf of the merchant system based at least in part on the CRM information; and communicating, using a merchant output of the aggregator system, data associated with the user and data associated with the transaction to the merchant system.

11. The method claim 10, wherein the selectable option comprises a displayed selectable advertisement associated with the merchant system and displayed on behalf of the merchant system.

12. The method of claim 10, wherein the content page comprises one or more fillable data fields, and further comprising pre-populating, using the MCAP, at least one of the one or more data fields based at least in part on the CRM information.

13. The method of claim 10, wherein the transaction is one of a payment transaction, a registration transaction, and a combination thereof.

14. The method of claim 10, further comprising displaying, using the MCAP, a content page published by the merchant system on the client device in response to the transaction being processed.

15. The method of claim 10, further comprising identifying the client device using an identification circuitry of the aggregator system.

16. The method of claim 10, further comprising temporarily storing, in the database, the data associated with the transaction.

17. The method of claim 10, further comprising coupling, using a network interface of the aggregator system, a communications network to the carrier input, the client device input, and the merchant output.

18. The method of claim 10, further comprising storing, in the database, application programming interfaces (APIs) that allow the aggregator system to process the transaction on behalf of the merchant system.

19. A non-transitory computer readable medium having stored instructions that when executed directs:
a mobile customer acquisition platform (MCAP) to display a selectable option associated with a merchant system on a client device associated with a user;
a client device input to receive an indication of a user selection of the selectable option;
a MCAP to provide a content page to the client device based on the user selection of the selectable option;
a carrier input to receive customer relationship management (CRM) information;
the MCAP to retrieve CRM information associated with the user in response to the user selection of the selectable option;
the MCAP to process a transaction on behalf of the merchant system based at least in part on the CRM information; and
a merchant output to output data associated with the user and data associated with the transaction to the merchant system.

20. The non-transitory computer readable medium of claim 19, wherein the selectable option comprises a displayed selectable advertisement associated with the merchant system and displayed on behalf of the merchant system.

21. The non-transitory computer readable medium of claim 19, wherein the content page comprises one or more fillable data fields, and wherein the stored instructions, when executed, further direct the MCAP to pre-populate at least one of the one or more data fields based at least in part on the CRM information.

22. The non-transitory computer readable medium of claim 19, wherein the transaction is one of a payment transaction, a registration transaction, and a combination thereof.

23. The non-transitory computer readable medium of claim 19, wherein the stored instructions, when executed, further direct the MCAP to display a content page published by the merchant system on the client device in response to the transaction being processed.

24. The non-transitory computer readable medium of claim 19, wherein the stored instructions, when executed, further direct identification circuitry to identify the client device.

25. The non-transitory computer readable medium of claim 19, wherein the stored instructions, when executed, further direct the database to temporarily store data associated with the transaction.

26. The non-transitory computer readable medium of claim 19, wherein the stored instructions, when executed, further direct a network interface to couple a communications network to the carrier input, the client device input, and the merchant output.

27. The non-transitory computer readable medium of claim 19, wherein the stored instructions, when executed, further direct the database to store application programming interfaces (APIs) that allow the aggregator system to process the transaction on behalf of the merchant system.

* * * * *